United States Patent
Chen et al.

(10) Patent No.: US 9,407,417 B2
(45) Date of Patent: Aug. 2, 2016

(54) IDENTIFYING MODULATION AND CODING SCHEMES AND CHANNEL QUALITY INDICATORS

(71) Applicant: QUALCOMM Incorporated, San Diego, CA (US)

(72) Inventors: Wanshi Chen, San Diego, CA (US); Peter Gaal, San Diego, CA (US); Tao Luo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/140,098

(22) Filed: Dec. 24, 2013

(65) Prior Publication Data

US 2014/0192732 A1 Jul. 10, 2014

Related U.S. Application Data

(60) Provisional application No. 61/750,601, filed on Jan. 9, 2013.

(51) Int. Cl.
H04L 5/00 (2006.01)
H04W 80/04 (2009.01)
(Continued)

(52) U.S. Cl.
CPC .......... *H04L 5/0057* (2013.01); *H04L 1/0003* (2013.01); *H04L 1/003* (2013.01); *H04L 1/0009* (2013.01); *H04L 1/0016* (2013.01); *H04L 1/0025* (2013.01); *H04L 1/0026* (2013.01)

(58) Field of Classification Search
CPC .... H04L 5/0007; H04W 80/04; H04W 88/06; H04W 28/04; H04W 72/04
USPC ........................................ 370/204, 328, 329
See application file for complete search history.

(56) References Cited

U.S. PATENT DOCUMENTS 8,040,912 B2   10/2011   Inamura et al.
8,340,212 B2   12/2012   Futagi et al.
(Continued)

FOREIGN PATENT DOCUMENTS

CN   102624481 A    8/2012
EP   1372290 A1   12/2003

OTHER PUBLICATIONS

Qualcomm Europe et al., "Definition of MIMO Operation on Hs-PDSCH, Preferred Precoding and CQI Reporting Procedures, Modified CQI Tables," 3GPP TSG-RAN WG1 Meeting #48, R1-071229, 3GPP TS 25.214 CR 430, rev. 10, v7.3.0, Feb. 12-16, 2007, St. Louis, Missouri, US, 16 pgs.

(Continued)

*Primary Examiner* — Ronald B Abelson
(74) *Attorney, Agent, or Firm* — Holland & Hart LLP

(57) ABSTRACT

Methods, systems, and devices are described for wireless communications. The use of at least two channel quality indicator (CQI) tables is supported. One of the at least two CQI table is identified. The identified CQI table is used to generate a CQI value for a wireless channel. In addition, the use of at least two modulation and coding scheme (MCS) tables is supported. A transmission is received via a wireless channel. One of the at least two MCS tables is identified to use for the received transmission. Further, a transport block size (TBS) table is identified that is mapped from the identified MCS table. The identified TBS table is used to determine a size of the received transmission.

86 Claims, 18 Drawing Sheets

(51) Int. Cl.
*H04W 88/06* (2009.01)
*H04W 28/04* (2009.01)
*H04W 72/04* (2009.01)
*H04L 1/00* (2006.01)

(56) References Cited

U.S. PATENT DOCUMENTS

| | | |
|---|---|---|
| 2006/0287743 A1 | 12/2006 | Sampath et al. |
| 2007/0066242 A1 | 3/2007 | Yi et al. |
| 2007/0070956 A1 | 3/2007 | Seki |
| 2008/0049813 A1 | 2/2008 | Kurose et al. |
| 2008/0188259 A1 | 8/2008 | Blanz et al. |
| 2009/0010211 A1 | 1/2009 | Sumasu et al. |
| 2009/0059877 A1 | 3/2009 | Utsunomiya et al. |
| 2009/0163142 A1 | 6/2009 | Pi et al. |
| 2009/0245408 A1 | 10/2009 | Mujtaba et al. |
| 2010/0150096 A1 | 6/2010 | Choi et al. |
| 2011/0026623 A1* | 2/2011 | Srinivasa et al. ............. 375/260 |
| 2011/0235604 A1 | 9/2011 | Inoue et al. |

OTHER PUBLICATIONS

Motorola, "Transport Block Size and MCS Signaling for E-UTRA," 3GPP TSG RAN1 #51, R1-074591, Nov. 5-9, 2007, Agenda Item 6.2.3, Jeju, Korea, 2 pgs.

Samsung et al., "WF on CSI Process Definition," 3GPP Draft, AI 6.2.2.4.2, R1-125336, WF on CSI Process Definition—Final, 3rd Generation Partnership Project (3GPP), Mobile Competence Centre; Nov. 15, 2012, Sophia-Antipolis Cedex, France, 2 pgs.

ISA/EPO, Partial International Search Report of the International Searching Authority, Int'l. App. No. PCT/US2013/077844, Apr. 4, 2014, European Patent Office, Rijswijk, NL, 10 pgs.

ISA/EPO, International Search Report and Written Opinion of the International Searching Authority, Int'l. App. No. PCT/US2013/077844, May 28, 2014, European Patent Office, Rijswijk, NL, 23 pgs.

* cited by examiner

| CQI Index | Modulation Scheme | Code Rate x 1024 | Efficiency |
|---|---|---|---|
| 0 | Out of Range | | |
| 1 | QPSK | 78 | 0.1523 |
| 2 | QPSK | 193 | 0.377 |
| 3 | QPSK | 449 | 0.877 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 64QAM | 948 | 5.5547 |
| 13 | 256QAM | 792 | 6.0313 |
| 14 | 256QAM | 873 | 6.8203 |
| 15 | 256QAM | 948 | 7.4063 |

New CQI Table

| CQI Index | Modulation Scheme | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.377 |
| 4 | QPSK | 308 | 0.6016 |
| 5 | QPSK | 449 | 0.877 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Old CQI Table

450

470

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Old MCS Table

480

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 8 | 25 |
| 26 | 8 | 26 |
| 27 | 8 | 27 |
| 28 | 8 | 28 |
| 29 | 4 | Reserved |
| 30 | 6 | |
| 31 | 8 | |

New MCS Table

FIG. 4C

IDENTIFYING MODULATION AND CODING SCHEMES AND CHANNEL QUALITY INDICATORS

CROSS REFERENCES

The present Application for patent claims priority to U.S. Provisional Patent Application No. 61/750,601 by Chen et al., entitled "Identifying Modulation and Coding Schemes and Channel Quality Indicators," filed Jan. 9, 2013, assigned to the assignee hereof.

BACKGROUND

The following relates generally to wireless communication, and more specifically to systems and methods to indicate a modulation and coding scheme (MCS) and a channel quality indicator (CQI) value for a wireless channel for wireless communication systems that support a higher order MCS. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. A base station may grant a mobile device resources for upstream transmissions. The grant may be based on CQI data about the downstream channel. The base station and mobile device may access a CQI reporting table and an MCS table to determine the CQI value from the CQI data as well as the MCS to use for a transmission. As wireless communication systems increase their support of additional MCSs, existing CQI tables and MCS tables may not include data entries that account for these additional MCSs that are supported by the communication system.

SUMMARY

The described features generally relate to one or more improved systems, methods, and/or apparatuses for selecting between different modulation and coding scheme (MCS) tables to identify an MCS to use for a transmission as well as selecting between different channel quality indicator (CQI) tables to identify a CQI value about a wireless channel. In one example, the selected MCS table may be used to look-up a size of a transport block that is being transmitted. The various MCS and CQI tables may support modulation schemes up to at least 256 Quadrature Amplitude Modulation (QAM).

In one example, a method for wireless communication is described. The use of at least two CQI tables may be supported. One of the at least two CQI tables may be identified. The identified CQI table may be used to generate a CQI value for a wireless channel.

In one configuration, a same number of bits may be used to represent the CQI value regardless of which CQI table is identified. The identification of the CQI table may be based at least in part on an identification of channel state information (CSI), from a plurality of CSI identifications. Each of the plurality of CSI identifications may be associated with a set of subframes, where the set of subframes may be determined based at least in part on a semi-static configuration or a semi-static indication.

In one example, a first CQI table may be identified to use for a first channel state information (CSI) process. A second CQI table may be identified to use for a second CSI process. The second CSI process may be different than the first CSI process.

Identifying one of the at least two CQI tables may include selecting the CQI table to use to generate the CQI value according to a predefined configuration setting. Identifying one of the at least two CQI tables may include dynamically selecting the CQI table to use to generate the CQI value.

In one example, a determination may be made as to whether the CQI value is to be transmitted via a control channel or a data channel. Upon determining that the CQI value is to be transmitted via the control channel, a first CQI table to use may be identified. A first number of bits may be used to represent the CQI value based on the first CQI table. Upon determining that the CQI value is to be transmitted via the data channel, a second CQI table to use may be identified. A second number of bits may be used to represent the CQI value based on the second CQI table. The second CQI table may be different from the first CQI table. In addition, the second number of bits may be greater than the first number of bits.

In one configuration, a determination may be made as to whether the CQI value is part of a P-CSI report or an aperiodic channel state information (A-CSI) report. Upon determining that the CQI value if part of the P-CSI report, a first CQI table to use may be identified. Upon determining that the CQI value is part of the A-CSI report, a second CQI table to use may be identified. In one example, the second CQI table may be different from the first CQI table.

In one example, a first CQI value may be generated using a first CQI table. A second CQI value may be generated using a second CQI table. The first CQI value and the second CQI value may be transmitted via a wireless channel in a single subframe.

The at least two CQI tables may include at least one common data entry. A CQI table may include a listing of CQI values. Each CQI value may be mapped to a spectral efficiency value. In one example, at least one of the identified CQI reporting tables may support 256 Quadrature Amplitude Modulation (QAM).

An apparatus for wireless communication is also described. The apparatus may include a processor and a memory in electronic communication with the processor. Instructions may be stored in the memory. The instructions may be executable by the processor to support the use of at least two CQI reporting tables, identify one of the at least two CQI tables, and use the identified CQI table to generate a CQI value for a wireless channel.

An apparatus for wireless communication is further described. The apparatus may include means for supporting the use of at least two CQI reporting tables, means for identifying one of the at least two CQI tables, and means for using the identified CQI table to generate a CQI value for a wireless channel.

A computer program product for managing wireless communications is also described. The computer program product may include a non-transitory computer-readable medium storing instructions executable by a processor to support the use of at least two channel CQI reporting tables, identify one of the at least two CQI tables, and use the identified CQI table to generate a CQI value for a wireless channel.

A method for wireless communication is further described. The use of at least two MCS tables is supported. A transmission may be received via a wireless channel. One of the at least two MCS tables may be identified to use for the received transmission. In one example, the identified MCS table may be used to determine an MCS to use for the received transmission.

A first transport block size (TBS) table may be mapped from a first MCS table and a second TBS table may be mapped from a second MCS table. The second TBS table may include at least one TBS that is greater than a maximum TBS in the first TBS table. In one example, a TBS table mapped from the identified MCS table may be identified. The identified TBS table may be used to determine a size of the received transmission.

Identifying one of the at least two MCS tables may include determining a type of transmission used to transmit the received transmission via the wireless channel, and identifying one of the at least two MCS tables to use for the received transmission based at least in part on the type of transmission.

Identifying one of the at least two MCS tables may also include identifying a type of control channel used to transmit the received transmission, and identifying one of the at least two MCS tables to use for the received transmission based at least in part on the identified type of control channel. In one example, the identified MCS table may be used to determine an MCS to use for an uplink transmission.

A first number of bits may be used to represent a first MCS based on a first MCS table. A second number of bits may be used to represent a second MCS based on a second MCS table. The first number of bits may be the same as the second number of bits. The second number of bits may be greater than the first number of bits.

Identifying one of the at least two MCS tables may further include dynamically selecting the MCS table to use for the received transmission, and/or selecting the MCS table to use for the received transmission according to a predefined configuration setting.

An apparatus for wireless communication is further described. The apparatus may include a processor and a memory in electronic communication with the processor. Instructions may be stored in the memory. The instructions may be executable by the processor to support the use of at least two MCS tables, receive a transmission via a wireless channel, and identify one of the at least two MCS tables to use for the received transmission.

A further apparatus for wireless communication is described. The apparatus may include means for supporting the use of at least two MCS tables, means for receiving a transmission via a wireless channel, and means for identifying one of the at least two MCS tables to use for the received transmission.

A computer program product for managing wireless communications is also described. The computer program product may include a non-transitory computer-readable medium storing instructions executable by a processor to support the use of at least two MCS tables, receive a transmission via a wireless channel, and identify one of the at least two MCS tables to use for the received transmission.

A further method for wireless communication is also described. The use of at least two MCS tables may be supported. One of the at least two MCS tables may be identified. The identified MCS table may be used to identify an MCS for a transmission.

In one example, a CQI value may be identified. The identified MCS may be based at least in part on the received CQI value. Using the identified MCS table to identify the MCS may include selecting the MCS for a downlink transmission. Using the identified MCS table to identify the MCS may include selecting the MCS for an uplink transmission.

In one configuration, the identification of one of the at least two MCS tables is based at least in part on a downlink control information (DCI) format. A first number of bits may be used to represent a first MCS based on a first MCS table. A second number of bits may be used to represent a second MCS based on a second MCS table. The first number of bits may be the same as the second number of bits. The second number of bits may be greater than the first number of bits.

In one example, a single MCS table may be associated with each assignment of a physical downlink shared channel (PDSCH). At least two codewords to be transmitted via a single physical downlink shared channel (PDSCH) may be identified. The identified one of the at least two MCS tables may be used for downlink transmissions of the at least two codewords.

In one example, a type of control channel to be used for the transmission may be identified. One of the at least two MCS tables to use for the transmission may be identified based at least in part on the identified type of control channel.

A set of candidates for a control channel transmission may be identified. One of the at least two MCS tables to use for the control channel transmission may be identified based at least in part on the identified set of candidates. A first set of candidates may be associated with a common search space, and a second set of candidates may be associated with a user equipment specific search space. At least one candidate associated with both the common search space and the user equipment search space may be identified. One of the at least two MCS tables may be identified based at least in part on a predefined rule.

In one configuration, a type of the transmission to occur on a wireless channel may be identified. One of the at least two MCS tables to use for the transmission may be identified based at least in part on the identified type of transmission.

Identifying one of the at least two MCS tables may include dynamically selecting the MCS table to use for the transmission. The dynamic selection of the MCS table may be performed by an information field in downlink control information, where the information field may select one of a plurality of sets of configurations, where each set of configuration may include parameters including an MCS table indicator and at least one of a rate matching parameter and a quasi-co-location indication parameter. Identifying one of the at least two MCS tables may include selecting the MCS table to use for the transmission according to a predefined configuration setting.

In one example, an MCS table may include a listing of MCSs. Each MCS may be mapped to at least one of a modulation scheme and a TBS. A first TBS table may be mapped from a first MCS table and a second TBS table may be mapped from a second MCS table. The second TBS table may include at least one TBS that is greater than a maximum TBS in the first TBS table. At least one of the identified MCS tables may support 256QAM.

An apparatus for wireless communication is also described. The apparatus may include processor and a memory in electronic communication with the processor. Instructions may be stored in the memory. The instructions may be executable by the processor to support the use of at least two MCS tables, identify one of the at least two MCS tables, and use the identified MCS table to identify an MCS for a transmission.

A further apparatus for wireless communication is described. The apparatus may include means for supporting the use of at least two MCS tables, means for identifying one of the at least two MCS tables, and means for using the identified MCS table to identify an MCS for a transmission.

A computer program product for managing wireless communications is also described. The computer program product may include a non-transitory computer-readable medium storing instructions executable by a processor to support the use of at least two MCS tables, identify one of the at least two MCS tables, and use the identified MCS table to identify an MCS for a transmission.

A further method for wireless communication is also described. The use of at least two CQI tables is supported. CQI data may be received for a wireless channel. One of the at least two CQI tables to use to identify a CQI value may be identified based on the CQI data.

In one example, a same number of bits may be used to represent the CQI value regardless of which CQI table is identified. Identifying one of the at least two CQI tables may include selecting the CQI table to use to identify the CQI value according to a predefined configuration setting. Identifying one of the at least two CQI tables may include dynamically selecting the CQI table to use to identify the CQI value.

An apparatus for wireless communication is further described. The apparatus may include a processor and a memory in electronic communication with the processor. Instructions may be stored in the memory. The instructions may be executable by the processor to support the use of at least two CQI tables, receive CQI data for a wireless channel, and identify one of the at least two CQI tables to use to identify a CQI value based on the CQI data.

A further apparatus for wireless communication is described. The apparatus may include means for supporting the use of at least two CQI tables, means for receiving CQI data for a wireless channel, and means for identifying one of the at least two CQI tables to use to identify a CQI value based on the CQI data.

A computer program product for managing wireless communications is also described. The computer program product may include a non-transitory computer-readable medium storing instructions executable by a processor to support the use of at least two CQI tables, receive CQI data for a wireless channel, and identify one of the at least two CQI tables to use to identify a CQI value based on the CQI data.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4B is an example of two examples of CQI tables in accordance with the present systems and methods;

FIG. 4C is an example of two examples of MCS tables in accordance with the present systems and methods;

DETAILED DESCRIPTION

Wireless communication standards may support various modulation and coding schemes for downlink and uplink transmissions. In one configuration, Quadrature Phase Shift Keying (QPSK), 16QAM, and 64QAM may be examples of schemes supported by a wireless communication standard. In one example, five bits may be used to represent an MCS to be used for a transmission. Using a five bit MCS may provide up to 32 possible MCSs to choose from for a transmission. An MCS table based on a five bit MCS may include a list of MCS indices from 0 to 31. Each index may correspond to at least one modulation scheme to be used for a transmission. In addition, each MCS index may be mapped to at least one transport block size (TBS) look-up index. The TBS look-up index may indicate a size of a transport block to be transmitted using the corresponding MCS.

In addition, a channel quality indicator (CQI) table, may be used to identify a CQI value for a wireless channel. A UE may be configured to report on channel quality using a CQI message. In LTE, both periodic and aperiodic (or event triggered) reporting of CQI is supported. CQI messages may be transmitted on the physical uplink control channel (PUCCH) on the primary component carrier, and not on a secondary component carrier (SCC). Alternatively or additionally, PUCCH may be transmitted on a secondary component carrier when two or more carriers do not have ideal backhaul as part of multi-flow operation or when there is a need to balance PUCCH overhead on different carriers. The CQI value may then be used to select a particular MCS to use for a transmission on the wireless channel. Currently, a CQI value may be represented using a number of bits, such as four bits. A CQI table may include a listing of CQI indices corresponding to the 16 possible CQI values (if four bits are used to represent the CQI value). Each CQI index value may be mapped to additional data that can be used to select an MCS.

In one example, a wireless communication standard may support schemes up to at least 256QAM. Additional MCS tables and CQI tables may be used to allow for these additional modulation schemes. Devices in a wireless communication system may select an appropriate CQI and MCS table to use to identify a CQI value of a wireless channel and the appropriate MCS to use for a transmission on that wireless channel.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
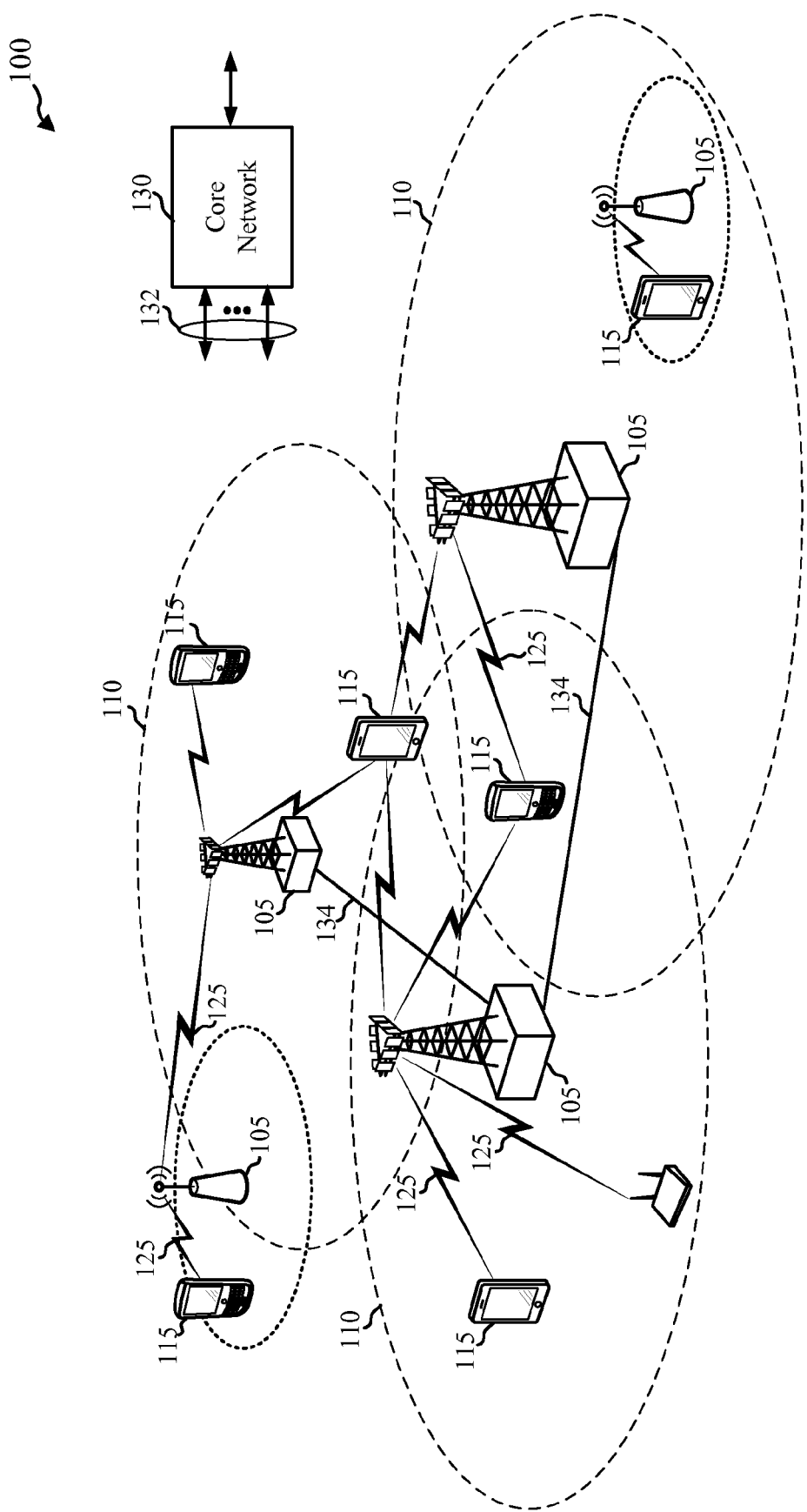
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various examples. Base stations 105 may communicate control information and/or user data with the core network 130 through backhaul links 132. In some examples, the base stations 105 may communicate, either directly or indirectly, with each other over backhaul links 134, which may be wired or wireless communication links. The system 100 may support operation on multiple carriers (waveform signals of different frequencies). According to various examples, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some examples, the system 100 may be an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In one example, an eNB 105 selects between various modulation and coding schemes (MCSs) to use for a transmission to a UE 115. The selected MCS may be based at least in part on a channel quality indicator (CQI) value reported from the UE 115. The eNB 105 may select between various CQI tables to identify the table corresponding to the CQI value received from the UE 115. The eNB 105 may also select between various MCS tables to identify the table from which an MCS may be identified for a transmission on the downlink and/or a transmission on the uplink. The selected MCS table may be based at least in part on the CQI value received from the UE 115.

The core network 130 may communicate with the eNBs 105 via a backhaul 132 (e.g., Si, etc.). The eNBs 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one configuration, the UE 115 may be able to select between various CQI tables to identify a table to use to generate the CQI value to report to the eNB 105. In addition, the UE 115 may be able to select between various MCS tables to identify the MCS table to use to identify the MCS that is being used for a downlink transmission and/or to identify the MCS that the UE 115 may use for an uplink transmission.

The transmission links 125 shown in network 100 may include uplink transmissions from a mobile device 115 to a base station 105, and/or downlink transmissions, from a base station 105 to a mobile device 115. The downlink transmissions may also be called forward link transmissions while the uplink transmissions may also be called reverse link transmissions. While the wireless system 100 is described in relation to LTE/LTE-Advanced architectures, those skilled in the art will readily appreciate, the various concepts presented throughout this disclosure may be extended to other types of wireless networks.

Figure 2:
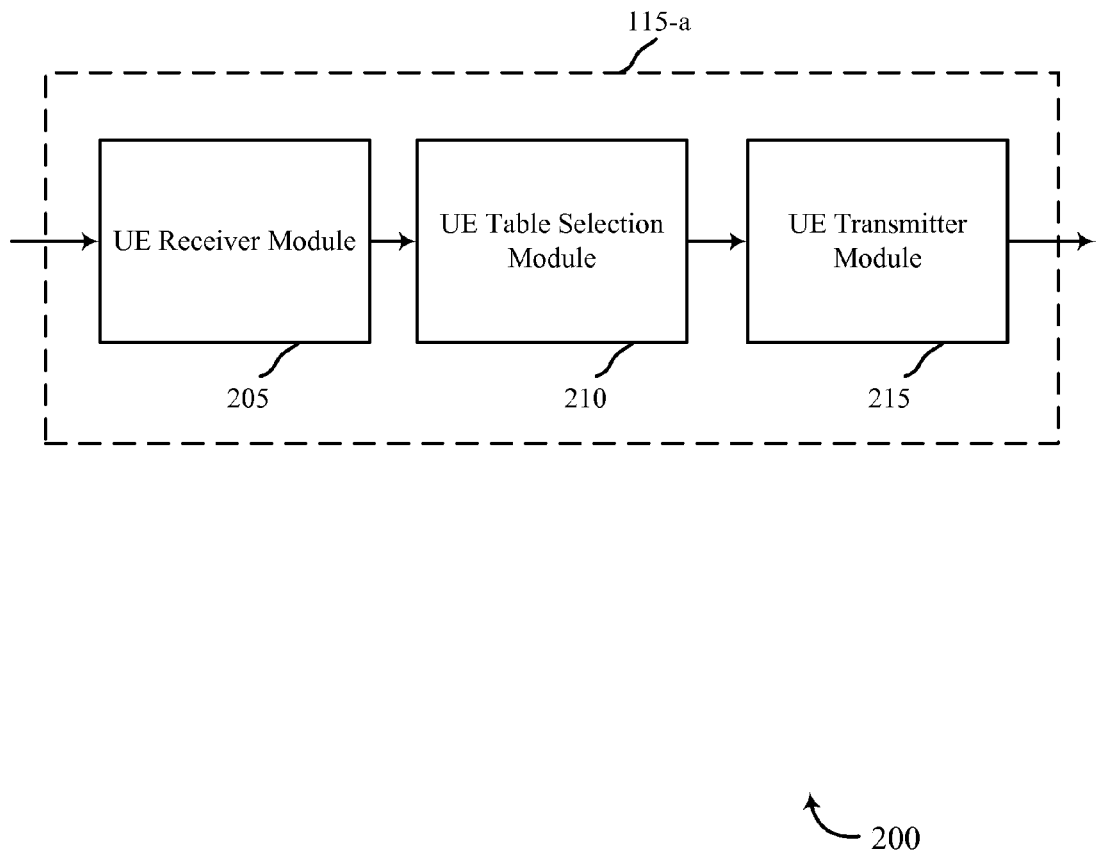
FIG. 2 is a block diagram illustrating one example of a UE in accordance with the present systems and methods.

FIG. 2 is a block diagram 200 illustrating one example of a UE 115-*a*, in accordance with the present systems and methods. The UE 115-*a* may be an example of the UE 115 of FIG. 1. The UE 115-*a* may include a UE receiver module 205, a UE table selection module 210, and a UE transmitter module 215. Each of these components may be in communication with each other.

These components of the UE 115-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 205 may include a cellular receiver and may receive transmissions from an eNB 105. The UE table selection module 210 may control the selection of a table to use to generate and/or identify certain information. The selection of the table may be based on predefined configuration settings of the UE 115-*a*. In one example, the selection module 210 may dynamically select the table to use based on one or more factors. In some cases, the generated and/or identified information resulting from the selected table may be transmitted via the UE transmitter module 215. Details regarding the UE table selection module 210 will be described below.

Figure 3:
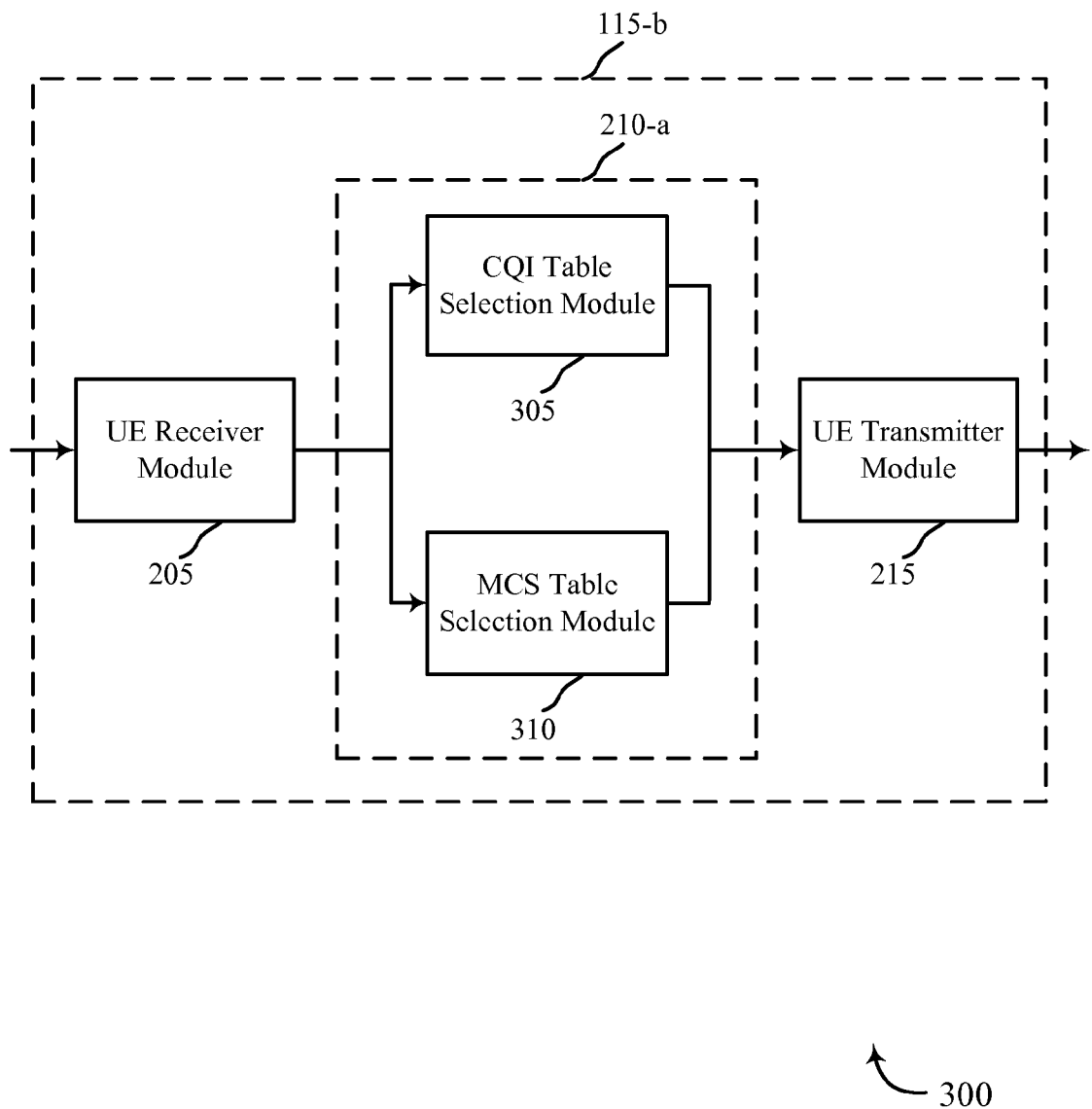
FIG. 3 shows a block diagram illustrating a further example of the UE.

FIG. 3 is a block diagram 300 illustrating one example of a UE 115-*b* in accordance with the present systems and methods. The UE 115-*b* may be an example of the UE 115 illustrated in FIGS. 1 and/or 2. The UE 115-*b* may include a UE receiver module 205, a UE table selection module 210-*a*, and a UE transmitter module 215, as previously described. Each of these components may be in communication with each other.

These components of the UE 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the UE 115-*b* may support the use of at least two CQI tables. In one configuration, the UE table selection module 210-*a* may include a CQI table selection module 305. The CQI table selection module 305 may identify one of the CQI tables supported by the UE 115-*b*. The identified table may be used to generate a CQI value for a wireless channel. A number of bits may be used to represent the CQI value. In one example, the number of bits used to represent the generated CQI value may remain the same regardless of the CQI table that is identified by the CQI table selection module 305. For example, four bits may be used to represent a CQI value. By using four bits, the CQI value may be one of 16 possible index values on a single CQI table. A CQI index value may be a factor that is used to identify an MCS to use for a received transmission and/or a transmission to be transmitted. As wireless communication standards increase the types of MCSs that may be used for transmissions, additional CQI tables may be used to allow the CQI value to still be represented by four bits.

In addition to supporting the use of multiple CQI tables, the UE 115-*b* may also support the use of at least two MCS tables. The UE table selection module 210-*a* may include an MCS table selection module 310. Transmission received by the UE receiver module 205 may have been modulated and encoded using a particular MCS at the transmitting device (e.g., an eNB 105). Upon receiving a transmission, the MCS table selection module 310 may select one of the at least two MCS tables to use for the received transmission. In one example, the identified MCS table may be used to determine the MCS to apply to the received transmission in order to demodulate and decode the transmitted information. In addition, when the UE 115-*b* has information to be transmitted via an uplink to the eNB 105, the eNB 105 may assign a particular MCS for the UE 115-*b* to use for the uplink transmission. The MCS table selection module 310 may select a particular MCS table and then identify the assigned MCS to use based on the selected MCS table.

In addition, the identified MCS table may also be used to identify a size of a received transmission. For example, the transmission may include a transport block (i.e., codeword) of particular size. This may be referred to herein as the transport block size (TBS). In one example, a TBS table that indicates the size of the transport block may be mapped from a particular MCS table supported by the UE 115-*b*. Upon identifying the MCS table to use to determine the MCS to use for the received transmission, the MCS table selection module 310 may use the selected MCS table to look-up the TBS table that has been mapped from the selected MCS table. As a result, the UE 115-*b* may determine the size of the received transport block.

Figure 4A:
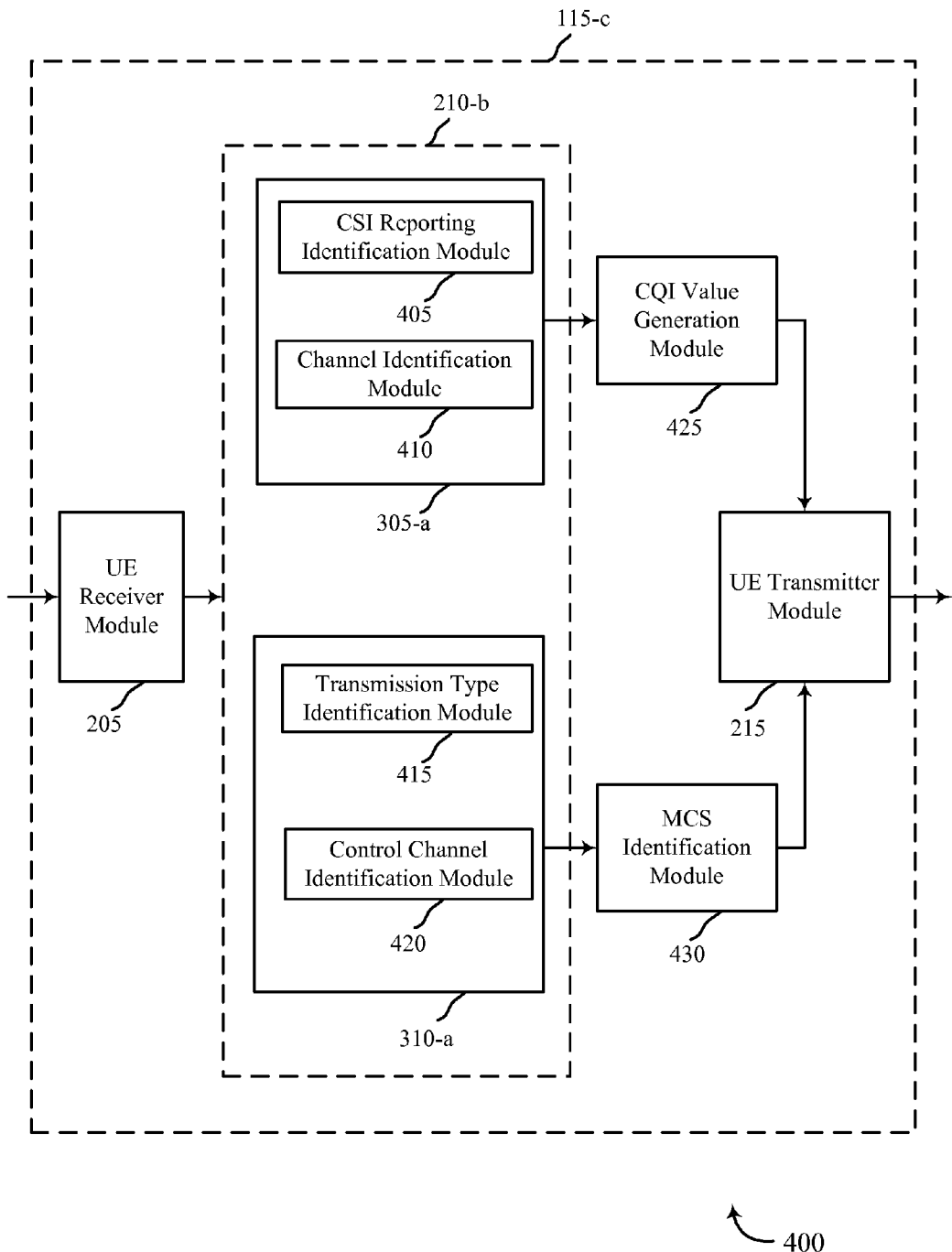
FIG. 4A is a block diagram illustrating a further example of the UE for implementing the functionality of the present systems and methods.

FIG. 4A is a block diagram 400 illustrating one example of a UE 115-*c* in accordance with the present systems and methods. The UE 115-*c* may be an example of the UE 115 illustrated in FIGS. 1, 2, and/or 3. In one configuration, the UE 115-*c* may include a UE receiver module 205, a UE table selection module 210-*b*, a CQI value generation module 425, an MCS identification module 430, and a UE transmitter module 215. Each of these components may be in communication with each other.

These components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the UE table selection module 210-b may include a CQI table selection module 305-a. The module 305-a may select one CQI table, from a plurality of CQI tables. The selected table may then be used by the CQI value generation module 425 to generate the CQI value for a wireless channel, such as a downlink channel.

In one example, the UE 115-c may support the use of a legacy CQI table (e.g., a table used for QPSK, 16QAM, and 64 QAM schemes) and a new CQI table used for higher order schemes, such as 256QAM. An example of a legacy CQI table used for lower order schemes is shown below as Table 1.

TABLE 1

| CQI Index | Modulation Scheme | Code Rate x 1024 | Efficiency |
|---|---|---|---|
| 0 | | Out of Range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

The new table may include enhanced spectral efficiencies as compared to the legacy table. In one example, the new CQI table may include non-uniform spectral efficiency entries (e.g., fine granularity at high spectral efficiency and coarse granularity at low spectra efficiency). The different CQI tables may also be associated with different downlink channel information (DCI) formats used by the eNB 105. For example, the legacy CQI table may be associated with DCI format 1A while the new CQI table may be associated with DCI format 2D. The different types of control information correspond to different DCI message sizes. DCI is therefore categorized into different DCI formats, where a format corresponds to a certain message size. The Physical Downlink Control Channel (PDCCH) is used to carry downlink control information (DCI) which signals allocation of resources to the UE. In one configuration, the legacy and new CQI tables may have one or more common data entries between them. An example of a new CQI table used for higher order schemes is shown below as Table 2.

TABLE 2

| CQI Index | Modulation Scheme | Code Rate x 1024 | Efficiency |
|---|---|---|---|
| 0 | | Out of Range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 64 QAM | 948 | 5.5547 |
| 13 | 256 QAM | 792 | 6.0313 |
| 14 | 256 QAM | 873 | 6.8203 |
| 15 | 256 QAM | 948 | 7.4063 |

In one configuration, each CQI value generated and reported by the UE 115-c may be based on a single CQI table. For example, the UE 115-c may use a single CQI table in accordance with Radio Resource Control (RRC) protocols. As previously described, the UE 115-c may support more than one CQI table and may determine which table to use based on various factors.

In one example, the CQI table selection module may include a channel state information (CSI) reporting identification module 405, and a channel identification module 410. In one configuration, the CSI reporting identification module 405 may identify periodic channel state information (P-CSI) from a plurality of P-CSI identifications. In one configuration, two P-CSI sets may be identified. A first P-CSI set may be associated with the legacy CQI table while a second P-CSI set may be associated with the new CQI table. As an example, a first P-CSI set may be associated with a restricted CSI measurement subframe set 1 and a second P-CSI set may be associated with a restricted CSI measurement subframe set 2, where the two restricted measurement subframe sets are configured by higher layers. As another example, in a time-division-duplex (TDD) system, a first P-CSI set may be associated with a set of measurement subframes where the set of subframes are subject to dynamic change of transmission directions (downlink or uplink), and a second P-CSI set may be associated with a set of downlink subframes for measurements where the set of subframes are not subject to dynamic change of transmission directions. Similarly, the CSI reporting identification module 405 may identify aperiodic channel state information (A-CSI) from a plurality of A-CSI identifications. In one configuration, two A-CSI sets may be identified. A first A-CSI set may be associated with the legacy CQI table while a second A-CSI set may be associated with the new CQI table.

The CSI module 405 may also identify one or more CSI processes and the CQI table selection module 305-a may select a different CQI table to use for each different CSI process. For example, the CSI reporting identification module 405 may identify a first CSI process and a second CSI process. The CQI table selection module 305-a may identify a first CQI table to use for the first CSI process and a second CQI table to use for the second CSI process.

In one configuration, the CSI reporting identification module 405 may also determine whether a CQI value is to be part of a P-CSI report or whether it is to be a part of an aperiodic CSI (A-CSI) report. Based on this determination, the CQI table selection module 305-a may select a first CQI table to use if the CQI value (based from the first CQI table) is to be part of a P-CSI report, or the module 305-a may select a second CQI table to use if the CQI value (based from the second CQI table) is to be part of an A-CSI report.

In one example, the CQI table selection module 305-a may also include a channel identification module 410. The module 410 may determine the type of channel to be used to transmit a CQI value. For example, the module 410 may determine whether the CQI value is to be transmitted via a control channel or a data channel. If the CQI value is to be transmitted via the control channel, the CQI table selection module 305-a may identify a first CQI table to use to generate the CQI value. In one example, the CQI value generated from the first table may be represented by a first number of bits, such as, but not limited to, four bits. If the CQI value is to be transmitted via the data channel, the CQI table selection module 305-a may identify a second CQI table to use. The second table may be different from the first table and the CQI value generated from the second CQI table may be represented by a different number of bits than had the CQI value been generated using the first table. In one example, if the first table is used to generate a 4-bit CQI value, the second table may be used to generate a 5-bit CQI value. In one example, the number of bits used to represent the CQI value may remain the same, regardless of the CQI table that is selected to use to generate the value.

In one example, a first set of ranks (e.g., rank 1) may be associated with a first CQI table, and a second set of ranks (e.g., rank 2 and higher) may be associated with a second CQI table.

In one example, a UE can be dynamically indicated which CQI table to be used. As an example, a 1-bit information field can be included in downlink control information (DCI) to indicate which one of two CQI tables to be used for aperiodic CQI reporting.

In some examples, the UE 115-c may generate and report multiple CQI values using multiple CQI tables in a single subframe. In one example, a first CQI value may be generated by the CQI value generation module 425 using a first CQI table. The module 425 may also generate a second CQI value using a second CQI table that is different from the first CQI table. The two CQI values may be transmitted to an eNB 105, for example, during a single subframe via the UE transmitter module 215.

In one configuration, each CQI table may include a listing of CQI index values. Each index value may represent a CQI value. As standards for wireless communication support higher orders of MCSs, additional CQI tables may be used that include these higher order schemes. The use of additional CQI tables may allow for CQI values to continue to use the same bit-width to represent the values. Each CQI index value may be mapped to a spectral efficiency value. As mentioned previously, at least one of the CQI tables may include non-uniform spectral efficiency data entries.

In one configuration, the UE table selection module 210-b may also include an MCS table selection module 310-a. The module 310-a may identify one MCS table, from a plurality of MCS tables. The identified table may then be used by the MCS identification module 430 to identify the MCS to use for a received transmission or a transmission that is to be transmitted on a wireless channel, such as an uplink channel.

In one example, the UE 115-c may support the use of a legacy MCS table (e.g., a table used for QPSK, 16QAM, and 64QAM schemes) and a new MCS table used for higher order schemes, such as 256QAM. An example of a legacy MCS table used for lower order schemes is shown below as Table 3. Table 3 illustrates a number of MCS indices, a corresponding modulation order, and a corresponding TBS index for each MCS index value.

TABLE 3

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

The different MCS tables may be associated with different downlink channel information (DCI) formats. For example, the legacy MCS table may be associated with DCI format 1A while the new MCS table may be associated with DCI format 2D. In one configuration, the legacy and new MCS tables may have one or more common data entries between them. In one example, the legacy and new MCS tables may have the same number of entries. In another example, the new MCS table may have a larger number of entries than that of the legacy table (e.g., a 6-bit table may be used for the new MCS table and a 5-bit table may be used for the legacy table). An example of a new 5-bit MCS table used for higher order schemes is shown below as Table 4. In this example, four entries (MCS Indexes 28-31) are reserved to possibly indicate four different modulation orders for retransmissions.

TABLE 4

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 6 |
| 6 | 2 | 7 |
| 7 | 2 | 8 |
| 8 | 2 | 9 |
| 9 | 4 | 10 |
| 10 | 4 | 11 |
| 11 | 4 | 12 |
| 12 | 4 | 13 |
| 13 | 4 | 14 |
| 14 | 4 | 15 |
| 15 | 6 | 16 |
| 16 | 6 | 17 |
| 17 | 6 | 18 |
| 18 | 6 | 19 |
| 19 | 6 | 20 |

TABLE 4-continued

| MCS Index | Modulation Order | TBS Index |
| --- | --- | --- |
| 20 | 6 | 21 |
| 21 | 6 | 22 |
| 22 | 6 | 23 |
| 23 | 6 | 24 |
| 24 | 8 | 25 |
| 25 | 8 | 26 |
| 26 | 8 | 27 |
| 27 | 8 | 28 |
| 28 | 2 | Reserved |
| 29 | 4 | |
| 30 | 6 | |
| 31 | 8 | |

Another example of a new 5-bit MCS table used for higher order schemes is shown below as Table 5. In this example, three entries (MCS Indexes 29-31) are reserved to possibly indicate three different modulation orders for retransmissions in order to make it possible to have 29 explicit entries.

TABLE 5

| MCS Index | Modulation Order | TBS Index |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 10 |
| 11 | 4 | 11 |
| 12 | 4 | 12 |
| 13 | 4 | 13 |
| 14 | 4 | 14 |
| 15 | 4 | 15 |
| 16 | 6 | 16 |
| 17 | 6 | 17 |
| 18 | 6 | 18 |
| 19 | 6 | 19 |
| 20 | 6 | 20 |
| 21 | 6 | 21 |
| 22 | 6 | 22 |
| 23 | 6 | 23 |
| 24 | 6 | 24 |
| 25 | 8 | 25 |
| 26 | 8 | 26 |
| 27 | 8 | 27 |
| 28 | 8 | 28 |
| 29 | 4 | Reserved |
| 30 | 6 | |
| 31 | 8 | |

In one configuration, each MCS identified by the MCS identification module 430 may be based on a single MCS table. For example, the UE 115-c may use a single MCS table in accordance with Radio Resource Control (RRC) protocols. As previously described, the UE 115-c may support more than one MCS table and may determine which table to use based on various factors.

In one example, the MCS table selection module 310-a may include a transmission type identification module 415, and a control channel identification module 420. In one configuration, the transmission type identification module 415 may identify a type of transmission used to transmit information to the UE 115-c from an eNB 105. Examples of transmission types may include broadcast, random access response, unicast, multi-cast, etc. The module 415 may also identify a type of scheduling used to transmit the received transmission. For example, the transmission type identification module 415 may identify a semi-persistent scheduling (SPS) of a service and the MCS table selection module 310-a may select a particular MCS table based on this determination. Thus, based on the identified transmission type, the MCS table selection module 310-a may identify an MCS table to use to identify an MCS for a transmission.

The control channel identification module 420 may identify a type of control channel used to transmit a received transmission. For example, the module 420 may identify a physical downlink control channel (PDCCH) was used and the MCS table selection module 310-a may identify the legacy MCS table to use to identify the MCS. If the module 420 identifies the control channel as being an enhanced PDCCH (ePDCCH), the MCS table selection module 310-a may select the new MCS table to use. In addition to the type of channel used for the transmission, the MCS table selection module 310-a may also identify the MCS table to use based on an index of a received subframe or a subframe type (e.g., whether it is a multimedia broadcast single-frequency network (MBSFN) subframe or not).

The MCS identification module 430 may identify the MCS to use for the transmission based on the selected table. The module 430 may also identify the TBS of the transmission. In one example, a first TBS table may be mapped from a first MCS table. In addition, a second TBS table may be mapped from a second MCS table. In one example, the second TBS table may include at least one TBS entry that is greater than a maximum TBS entry of the first TBS table. The MCS identification module 430 may use the selected MCS table to look-up the corresponding TBS table and identify the size of the transmission. In one configuration, the MCS identification module 430 may use a first number of bits to represent the MCS identified from a first MCS table. For a different MCS table, the module 430 may use a second number of bits to represent the MCS. The second number of bits may be greater than the first number of bits. In one example, the number of bits used to represent the MCS may remain the same regardless of the MCS table that is identified.

FIG. 4B shows two examples of a CQI table in accordance with the present systems and methods. An example of an old, or legacy, CQI table 450 (e.g., a table used for QPSK, 16QAM, and 64QAM schemes) as well as an example of a new CQI table 460 (e.g., a table used for higher order schemes, such as 256QAM) are shown. In some cases, the old CQI table 450 and the new CQI table 460 are examples of the old CQI table and the new CQI table of FIG. 4A.

FIG. 4C shows two examples of an MCS table in accordance with the present systems and methods. An example of an old, or legacy, MCS table 470 (e.g., a table used for QPSK, 16QAM, and 64QAM schemes) as well as an example of a new MCS table 480 (e.g., a table used for higher order schemes, such as 256QAM) are shown. In some cases, the old MCS table 470 and the new MCS table 480 are examples of the old MCS table and the new MCS table of FIG. 4A.

Figure 5:
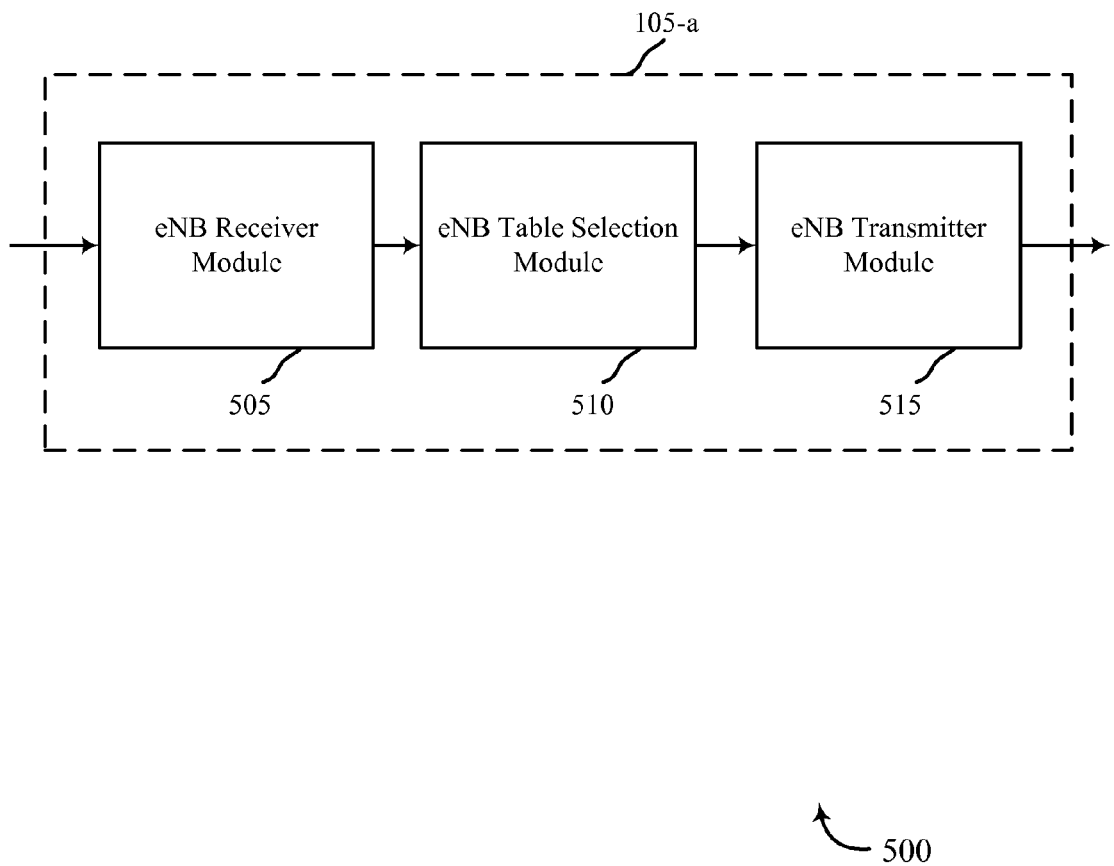
FIG. 5 shows a block diagram of an example of a eNB.

FIG. 5 is a block diagram 500 illustrating one example of an eNB 105-a, in accordance with the present systems and methods. The eNB 105-a may be an example of the eNB 105 of FIG. 1. The eNB 105-a may include an eNB receiver module 505, a eNB table selection module 510, and a eNB transmitter module 515. Each of these components may be in communication with each other.

These components of the eNB 105-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 505 may include a cellular receiver and may receive transmissions from a UE 115. The eNB table selection module 510 may control the selection of a table to use to generate and/or identify certain information. The selection of the table may be based on predefined configuration settings of the eNB 105-a. In one example, the selection module 510 may dynamically select the table to use based one or more factors. In some cases, the generated and/or identified information resulting from the selected table may be transmitted via the eNB transmitter module 515. Details regarding the eNB table selection module 510 will be described below.

Figure 6:
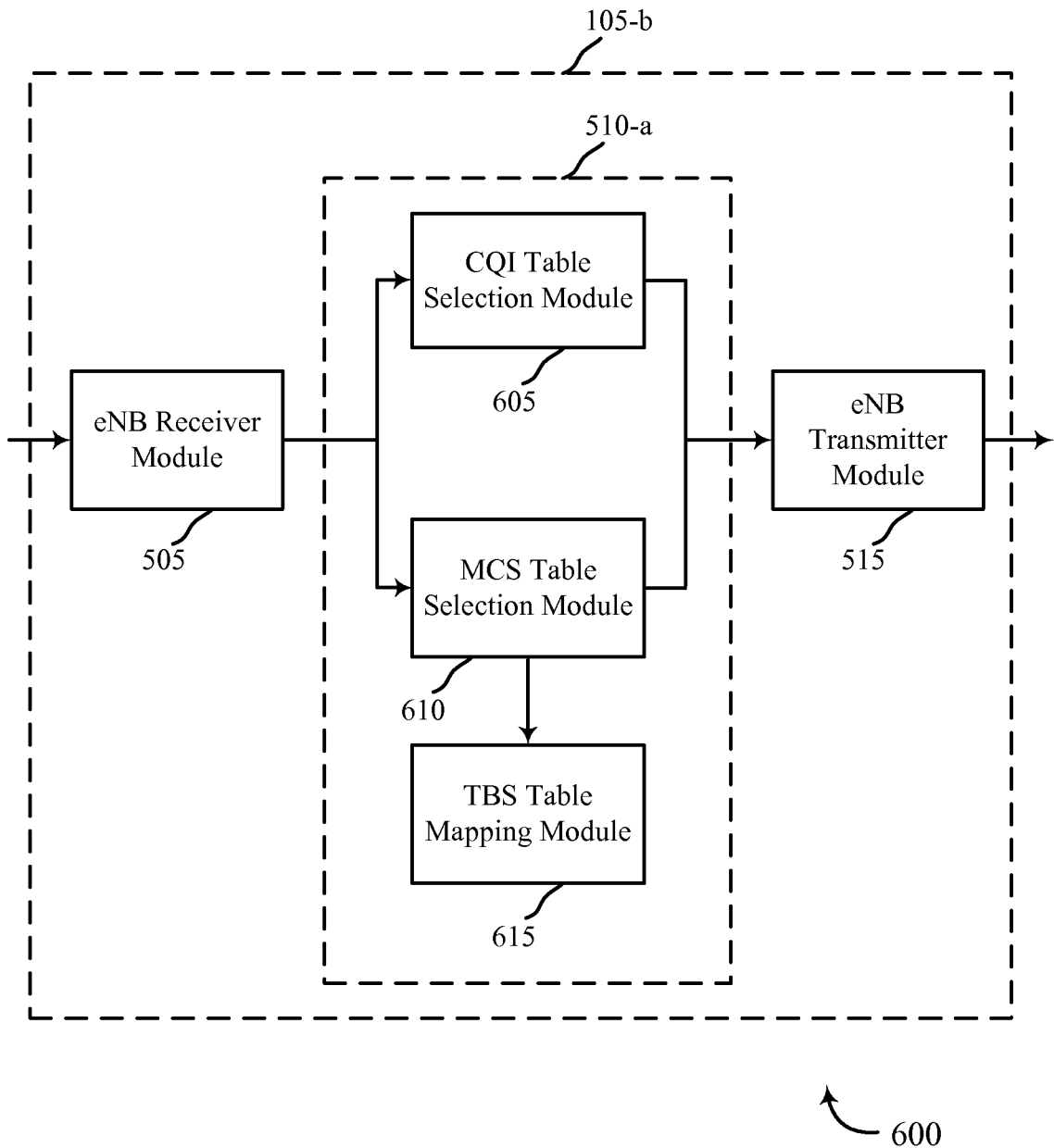
FIG. 6 shows a block diagram of a further example of the eNB.

FIG. 6 is a block diagram 600 illustrating one example to of an eNB 105-b in accordance with the present systems and methods. The eNB 105-b may be an example of the eNB 105 illustrated in FIGS. 1 and/or 5. The eNB 105-b may include an eNB receiver module 505, an eNB table selection module 510-a, and an eNB transmitter module 515, as previously described. Each of these components may be in communication with each other.

These components of the eNB 105-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the eNB 105-b may support the use of at least two CQI tables that may be either predetermined or configured by RRC protocols. In one configuration, the eNB table selection module 510-a may include a CQI table selection module 605. The CQI table selection module 605 may identify one the CQI tables supported by the eNB 105-b. The identified table may be used to identify a CQI value from received CQI data about a wireless channel. A number of bits may be used to represent the CQI value. In one example, the number of bits used to represent the identified CQI value may remain the same regardless of the table that is identified by the table selection module 605.

In addition to supporting the use of multiple CQI tables, the eNB 105-b may also support the use of at least two MCS tables. The eNB table selection module 510-a may include an MCS table selection module 610. Transmissions to be transmitted by the eNB transmitter module 515 may be modulated and encoded using a particular MCS. The MCS table selection module 610 may select one of the at least two MCS tables to use for the transmission. In one example, the identified MCS table may be used to determine the MCS to apply to the transmission based on the identified CQI value of the wireless channel that will carry the transmission. In addition, when a UE 115 has information to be transmitted via an uplink to the eNB 105-b, the eNB 105-b may assign a particular MCS for the UE 115 to use for the uplink transmission.

In one example, the eNB table selection module may also include a TBS table mapping module 615. In one configuration, an MCS table may be mapped to a TBS table to allow the UE 115 to determine a size of a transmission. In one example, the TBS table mapping module 615 may map a TBS table that indicates the size of a transport block to be transmitted from a particular MCS table supported by the eNB 105-b. When the UE 115 identifies the MCS table that was used to generate the MCS for the transmission, the UE 115 may also use the selected MCS table to look-up the TBS table that has been mapped from the selected MCS table. As a result, the UE 115 may determine the size of a received transport block.

In one configuration, one or more TBS tables may be mapped from a new MCS table being used to identify MCSs for transmissions via a physical downlink shared channel (PDSCH). New TBS index values in the one or more TBS tables that are mapped from MCS index values in the new MCS table may be defined. In one example, the new TBS index values may be, for example, greater than 26, which is a current maximum number of TBS index values mapped from legacy MCS tables. The number of TBS index values may increase to facilitate an increase of downlink and/or uplink transmission rates and/or peak rates. In another example, a first transport block size resulting from a TBS index value mapped from the new MCS table may be different from a second TBS resulting from a same TBS index value mapped from the legacy MCS table. As an example, the first TBS may be larger than the second TBS. This may facilitate an increase of downlink and/or uplink transmission rates and/or peak rates.

Figure 7:
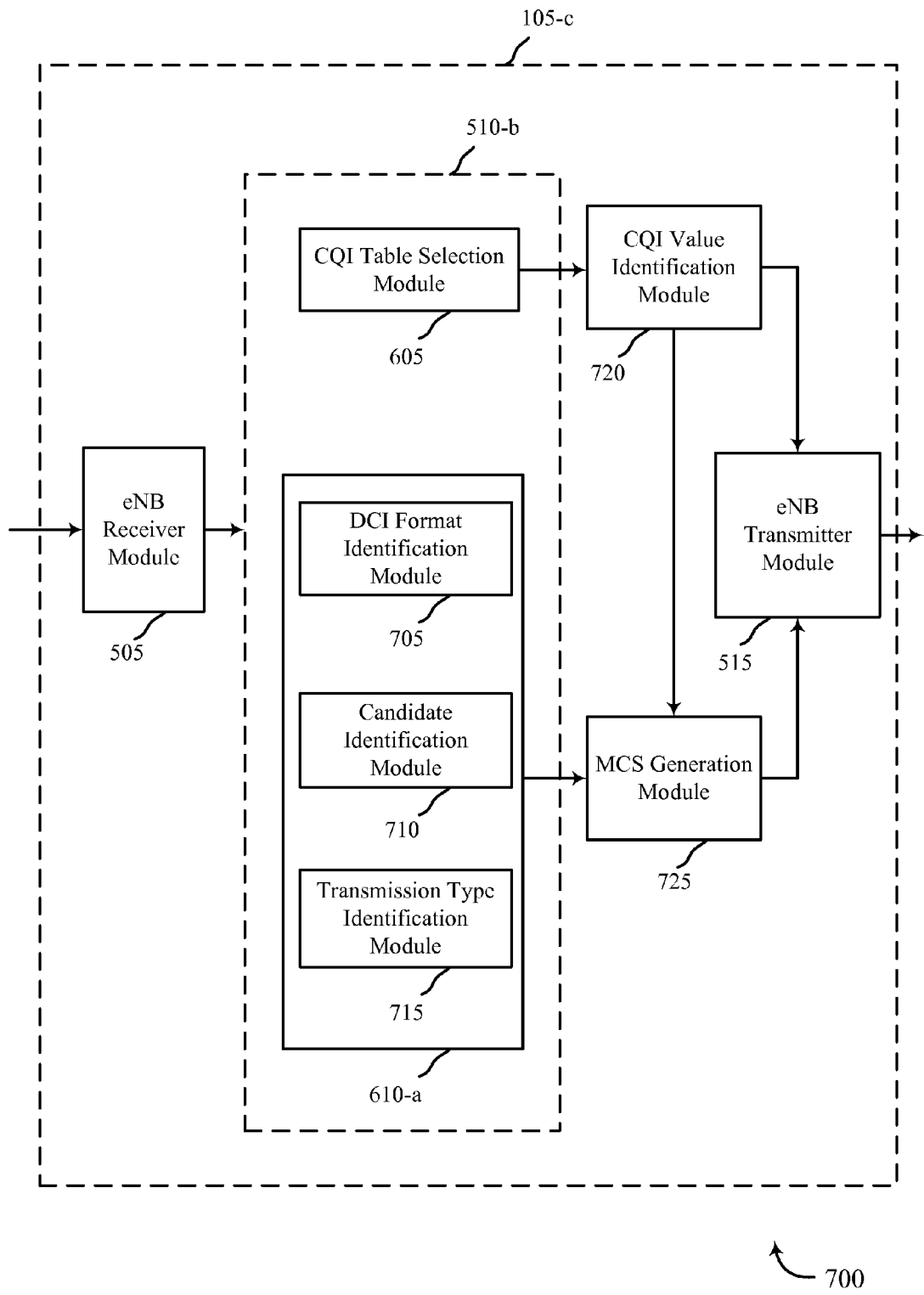
FIG. 7 is a block diagram illustrating one example of the eNB for implementing the functionality of the present systems and methods.

FIG. 7 is a block diagram 700 illustrating one example of an eNB 105-c in accordance with the present systems and methods. The eNB 105-c may be an example of the eNB 105 illustrated in FIGS. 1, 5, and/or 6. In one configuration, the eNB 105-c may include an eNB receiver module 505, an eNB table selection module 510-b, a CQI value identification module 720, an MCS generation module 725, and an eNB transmitter module 515. Each of these components may be in communication with each other.

These components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the eNB table selection module 510-b may include a CQI table selection module 605. The eNB 105-c may support the use of a legacy CQI table and new CQI table. The module 605 may select one CQI table, from a plurality of CQI tables used by a UE to generate a CQI value. The selected table may then be used by the CQI value identification module 720 to identify a CQI value from CQI data received for a wireless channel, such as a downlink channel.

In one example, the eNB 105-c may support the use of a legacy MCS table (e.g., a table used for QPSK, 16QAM, and 64QAM schemes) and a new MCS table used for higher order schemes, such as 256QAM. In one example, the different MCS tables may be associated with different DCI formats. For example, the legacy MCS table may be associated with DCI format 1A while the new MCS table may be associated with DCI format 2D. In one configuration, the legacy and new MCS tables may have one or more common data entries between them. In one example, the legacy and new MCS tables may have the same number of entries. In another example, the new MCS table may have a larger number of entries than that of the legacy table (e.g., a 6-bit table may be used for the new MCS table and a 5-bit table may be used for the legacy table).

In one configuration, each MCS identified by the MCS generation module 725 may be based on a single MCS table. In one configuration, each assignment of a PDSCH by the eNB 105-c may be associated with a single MCS table. As previously described, the eNB 105-c may support the use of more than one MCS table and may determine which table to use based on various factors.

In one example, the MCS table selection module 610-a may include at least one of a DCI format identification module 705, a candidate identification module 710, and a transmission type identification module 715. The DCI format identification module 705 may identify the DCI format of the transmission. The MCS table selection module 610-a may select the MCS table to use for the transmission based on the identified DCI format.

The candidate identification module 710 may identify a set of control channel decoding candidates that are to receive a control channel transmission. One of the MCS tables may be identified by the MCS table selection module 610-a based at least in part on the identified set of candidates. As an example, a decoding candidate in a common search space is associated with a legacy MCS table, and a decoding candidate in a UE-specific search space is associated with a new MCS table. If there is an overlap between the common search space and the UE-specific search space, a predefined rule can be used. As an example, if a decoding candidate belongs to both the common search space and the UE-specific search space, a legacy MCS table is determined. Alternatively, a new MCS table is determined. The candidate identification module 710 may also identify a type of control channel to be used for the transmission. The MCS table to use may be identified based on the type of control channel. For example, the module 710 may identify a PDCCH to be used for the transmission and the MCS table selection module 610-a may identify the legacy MCS table to use to generate the MCS for the transmission. If the module 710 identifies the control channel as being an ePDCCH, the MCS table selection module 610-a may select the new MCS table to use. In addition to the type of channel used for the transmission, the MCS table selection module 610-a may also identify the MCS table to use based on an index of a received subframe.

In one configuration, the transmission type identification module 715 may identify a type of transmission to be used for the transmission. Examples of transmission types may include broadcast, random access response, unicast, multicast, etc. The module 715 may also identify a type of scheduling used for the transmission. For example, the transmission type identification module 715 may identify a semi-persistent scheduling (SPS) of a service and the MCS table selection module 610-a may select a particular MCS table based on this determination. Thus, based on the identified transmission type, the MCS table selection module 610-a may identify an MCS table to use to identify an MCS for a transmission.

The MCS generation module 725 may determine the MCS to use for the transmission based on the selected table as well as the identified CQI value for the wireless channel. In one configuration, the MCS generation module 725 may use a first number of bits to represent the MCS based on a first MCS table. For a different MCS table, the module 725 may use a second number of bits to represent the MCS. The second number of bits may be greater than the first number of bits. In one example, the number of bits used to represent the MCS may remain the same regardless of the MCS table that is used. The MCS may be selected for downlink or uplink transmissions. In one example, multiple transport blocks (e.g., codewords) may be transmitted via a single PDSCH. In one example, the same MCS table may be used by the MCS generation module 725 identify the MCSs for downlink transmissions of each separate transport block. In another example, different MCS tables may be used by the MCS generation module 725 to identify the MCSs to use for downlink transmissions of each separate transport block. As an example, a PDSCH transmission of a first set of ranks (e.g., rank 1) may be associated with a first MCS table, and a PDSCH transmission of a second set of ranks (e.g., rank 2 and higher) may be associated with a second MCS table.

A UE may be under a coordinated multi-point (CoMP) operation. In this case, a PDSCH rate-matching and Quasi-co-location Indication (PQI) information field may be included in downlink control information (DCI) to dynamically indicate to the UE which one out of up to four PQI parameters configured by higher layers is to be used for a particular PDSCH transmission. An MCS table indication can be included in some or all sets of PQI parameters configured by higher layers. The indication can be one or more bits. As an example, a one-bit indication can indicate whether a legacy or a new MCS table is to be used for the corresponding PDSCH transmission. The inclusion of the MCS table indication in PQI makes it possible to support CoMP for a UE with cells of different releases. That is, some cells may support 256QAM, while other cells may not. In addition, the UE may experience different channel conditions from each of the cells in CoMP and consequently, some of the cells may be suitable for enabling 256QAM while other cells may be not. A given cell may be more suitable for enabling 256QAM at one time, but becomes more suitable for disabling 256QAM later. The inclusion of the MCS table indication in PQI is thus beneficial in enabling/disabling 256QAM for different cells and/or different subframes in a dynamic manner.

Figure 8:
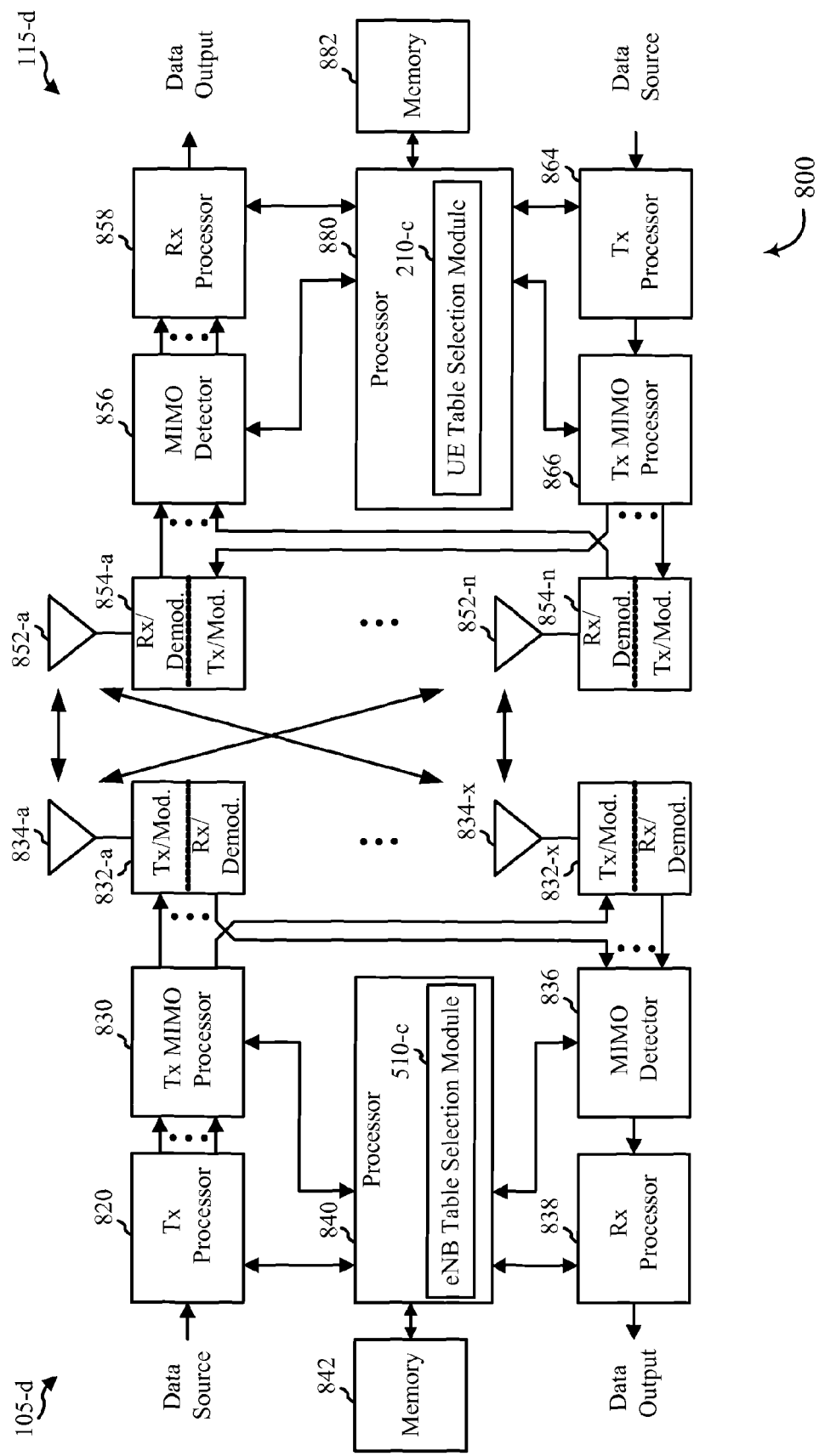
FIG. 8 is a block diagram of a MIMO communication system including an eNB and a mobile device.

FIG. 8 is a block diagram of a MIMO communication system 800 including an eNB 105-d and a UE 115-d. This system 800 may illustrate aspects of the system 100 of FIG. 1. The eNB 105-d may be an example of the eNB 105 of FIGS. 1, 5, 6, and/or 7. The UE 115-d may be an example of the UE 115 of FIGS. 1, 2, 3, and/or 4A. The eNB 105-d may be equipped with antennas 834-a through 834-x, and the UE 115-d may be equipped with antennas 852-a through 852-n. In the system 800, the eNB 105-d may be able to send data over multiple communication links at the same time. Each communication link may be called a "layer" and the "rank" of the communication link may indicate the number of layers used for communication. For example, in a 2×2 MIMO system where eNB 105-d transmits two "layers," the rank of the communication link between the eNB 105-d and the UE 115-d is two.

At the eNB 105-d, a transmit processor 820 may receive data from a data source. The transmit processor 820 may process the data. The transmit processor 820 may also generate reference symbols, and a cell-specific reference signal. A transmit (TX) MIMO processor 830 may perform spatial processing (e.g., precoding) on data symbols, control symbols, and/or reference symbols, if applicable, and may provide output symbol streams to the transmit modulators 832-a through 832-x. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. In one example, downlink signals from modulators 832-*a* through 832-*x* may be transmitted via the antennas 834-*a* through 834-*x*, respectively.

At the UE 115-*d*, the UE antennas 852-*a* through 852-*n* may receive the downlink signals from the eNB 105-*d* and may provide the received signals to the demodulators 854-*a* through 854-*n*, respectively. Each demodulator 854 may condition (e.g., filter, amplify, downconvert, and digitize) a respective received signal to obtain input samples. Each demodulator 854 may further process the input samples (e.g., for OFDM, etc.) to obtain received symbols. A MIMO detector 856 may obtain received symbols from all the demodulators 854-*a* through 854-*n*, perform MIMO detection on the received symbols if applicable, and provide detected symbols. A receive processor 858 may process (e.g., demodulate, deinterleave, and decode) the detected symbols, providing decoded data for the UE 115-*d* to a data output, and provide decoded control information to a processor 880, or memory 882. In one example, the processor 880 may include a UE table selection module 210-*c* to implement the systems and methods described herein. The UE table selection module 210-*c* may be examples of the module 210 of FIGS. 2, 3, and/or 4A.

On the uplink, at the UE 115-*d*, a transmit processor 864 may receive and process data from a data source. The transmit processor 864 may also generate reference symbols for a reference signal. The symbols from the transmit processor 864 may be precoded by a transmit MIMO processor 866 if applicable, further processed by the demodulators 854-*a* through 854-*n* (e.g., for SC-FDMA, etc.), and be transmitted to the eNB 105-*d* in accordance with the transmission parameters received from the eNB 105-*d*. At the eNB 105-*d*, the uplink signals from the UE 115-*d* may be received by the antennas 834, processed by the demodulators 832, detected by a MIMO detector 836 if applicable, and further processed by a receive processor. The receive processor 838 may provide decoded data to a data output and to the processor 840. The processor 840 may include an eNB table selection module 510-*c* to implement the systems and methods described herein. The module 510-*c* may be an example of the eNB table selection module 510 of FIGS. 5, 6, and/or 7. The components of the UE 115-*d* may, individually or collectively, be implemented with one or more Application Specific Integrated Circuits (ASICs) adapted to perform some or all of the applicable functions in hardware. Each of the noted modules may be a means for performing one or more functions related to operation of the system 800.

Similarly, the components of the eNB 105-*d* may, individually or collectively, be implemented with one or more Application Specific Integrated Circuits (ASICs) adapted to perform some or all of the applicable functions in hardware. Each of the noted components may be a means for performing one or more functions related to operation of the system 800.

The communication networks that may accommodate some of the various disclosed examples may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Figure 9:
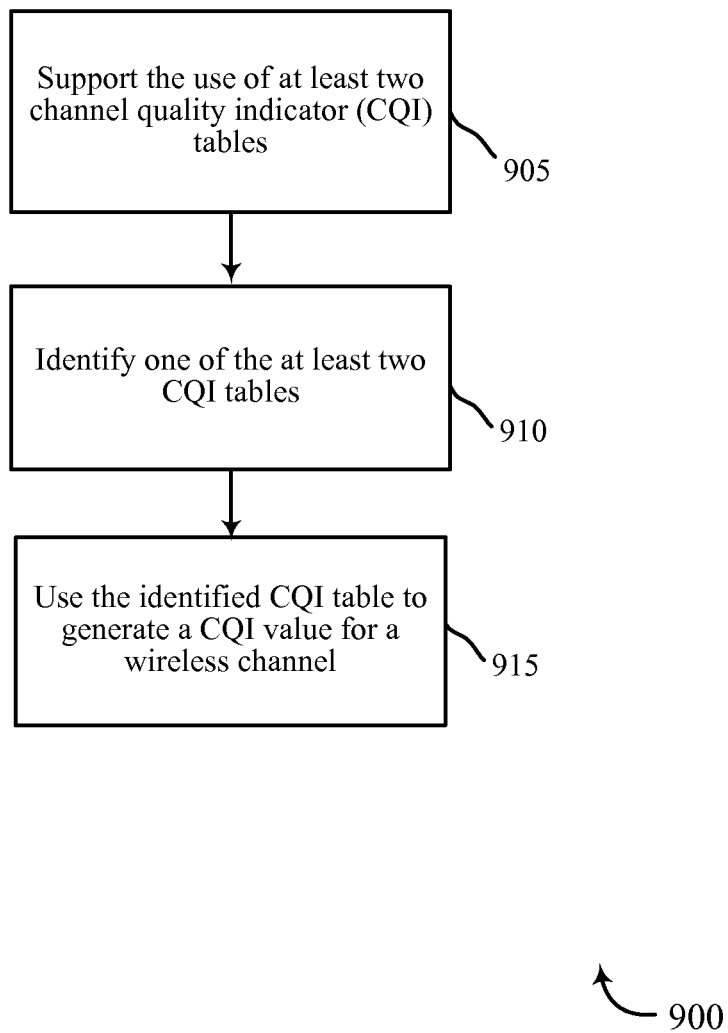
FIG. 9 is a flow chart of a method for managing wireless communications for higher order MCS by supporting additional CQI tables.

FIG. 9 is a flow chart illustrating one example of a method 900 for wireless communications. For clarity, the method 900 is described below with reference to the UE 115 of FIGS. 1, 2, 3, 4A, and/or 8. In some cases, the method 900 is described below with reference to the example CQI tables of FIG. 4B. In one implementation, the UE table selection module 210 of FIGS. 2, 3, 4A, and/or 8 may execute one or more sets of codes to control the functional elements of the UE 115 to perform the functions described below.

At block 905, the use of at least two CQI tables may be supported. At block 910, one of the at least two CQI tables may be identified. At block 915, the identified CQI table may be used to generate a CQI value for a wireless channel. For example, the CQI value may be generated for a downlink channel. In one example, a same number of bits may be used to represent the CQI value independent of the selected CQI table to use. At least one of the CQI tables may support 256QAM.

Therefore, the method 900 may provide for managing wireless communications for higher order MCS by supporting additional CQI tables. It should be noted that the method 900 is just one implementation and that the operations of the method 900 may be rearranged or otherwise modified such that other implementations are possible.

Figure 10:
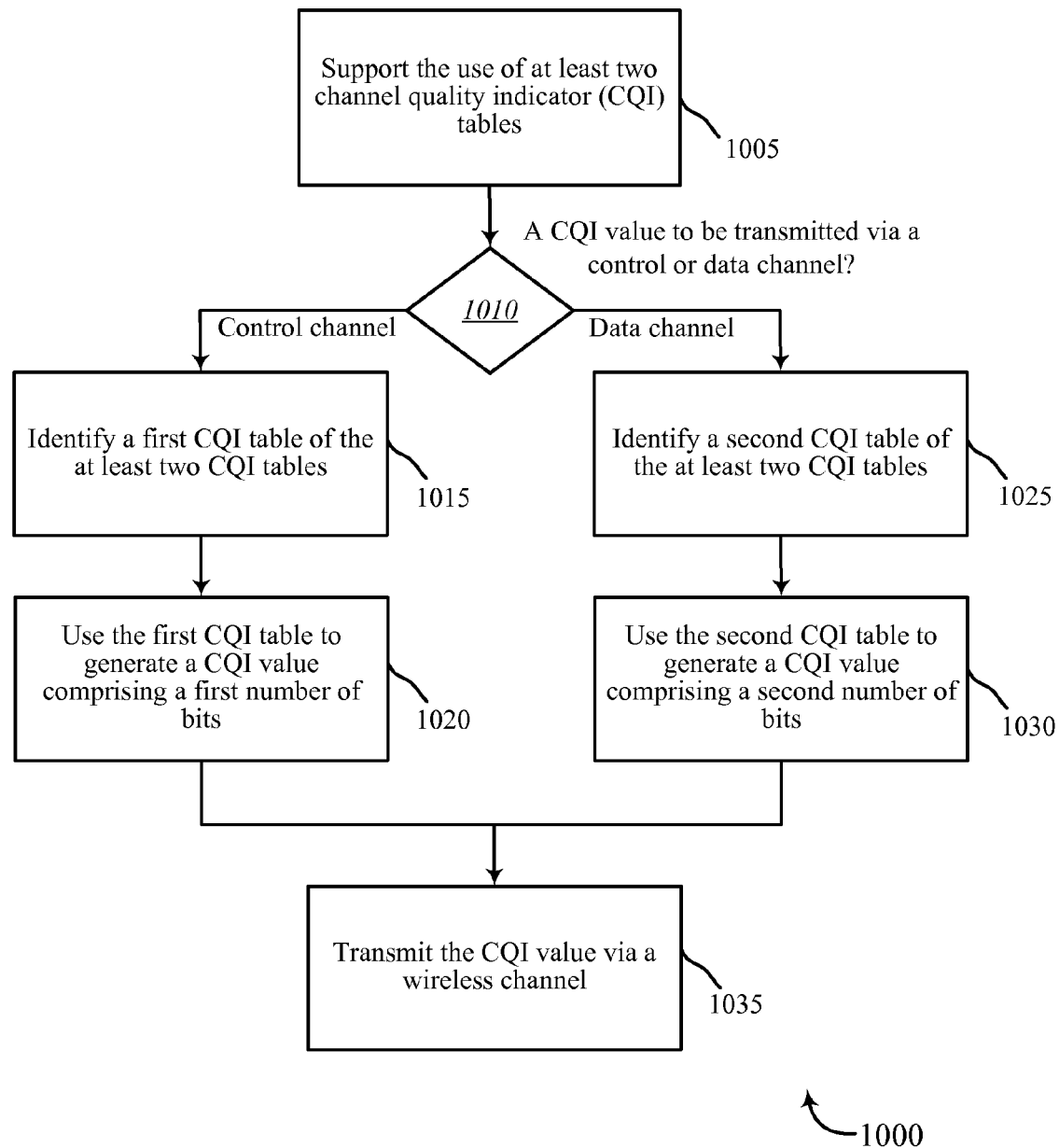
FIG. 10 is a flow chart of a method for selecting different CQI tables based on a medium of transmission.

FIG. 10 is a flow chart illustrating one example of a method 1000 for wireless communications. For clarity, the method 1000 is described below with reference to the UE 115 of FIGS. 1, 2, 3, 4A, and/or 8. In some cases, the method 1000 is described below with reference to the example CQI tables of FIG. 4B. In one implementation, the UE table selection module 210 of FIGS. 2, 3, 4A, and/or 8 may execute one or more sets of codes to control the functional elements of the UE 115 to perform the functions described below.

At block 1005, the use of at least two CQI tables may be supported. At block 1010, a determination may be made as to whether a CQI value is to be transmitted via a control channel or a data channel. If it is determined that the CQI value is to be transmitted via a control channel, at block 1015, a first CQI table may be identified. At block 1020, the first CQI table may be used to generate a CQI value represented by a first number of bits.

If, however, it is determined that the CQI value is to be transmitted via a data channel, at block 1025, a second CQI table may be identified that is different from the first CQI table. At block 1030, the second CQI table may be used to generate a CQI value represented by a second number of bits. In one example, the second number of bits is different than the first number of bits. In one configuration, the second number of bits is greater than the first number of bits. In another example, the number of bits used to represent the CQI value remains the same regardless of the CQI table that is identified. At block 1035, the CQI value may be transmitted via a wireless channel.

Thus, the method 1000 may provide for selection of different CQI tables based on whether a CQI value is transmitted via a data channel or control channel. It should be noted that the method 1000 is just one implementation and that the operations of the method 1000 may be rearranged or otherwise modified such that other implementations are possible.

Figure 11:
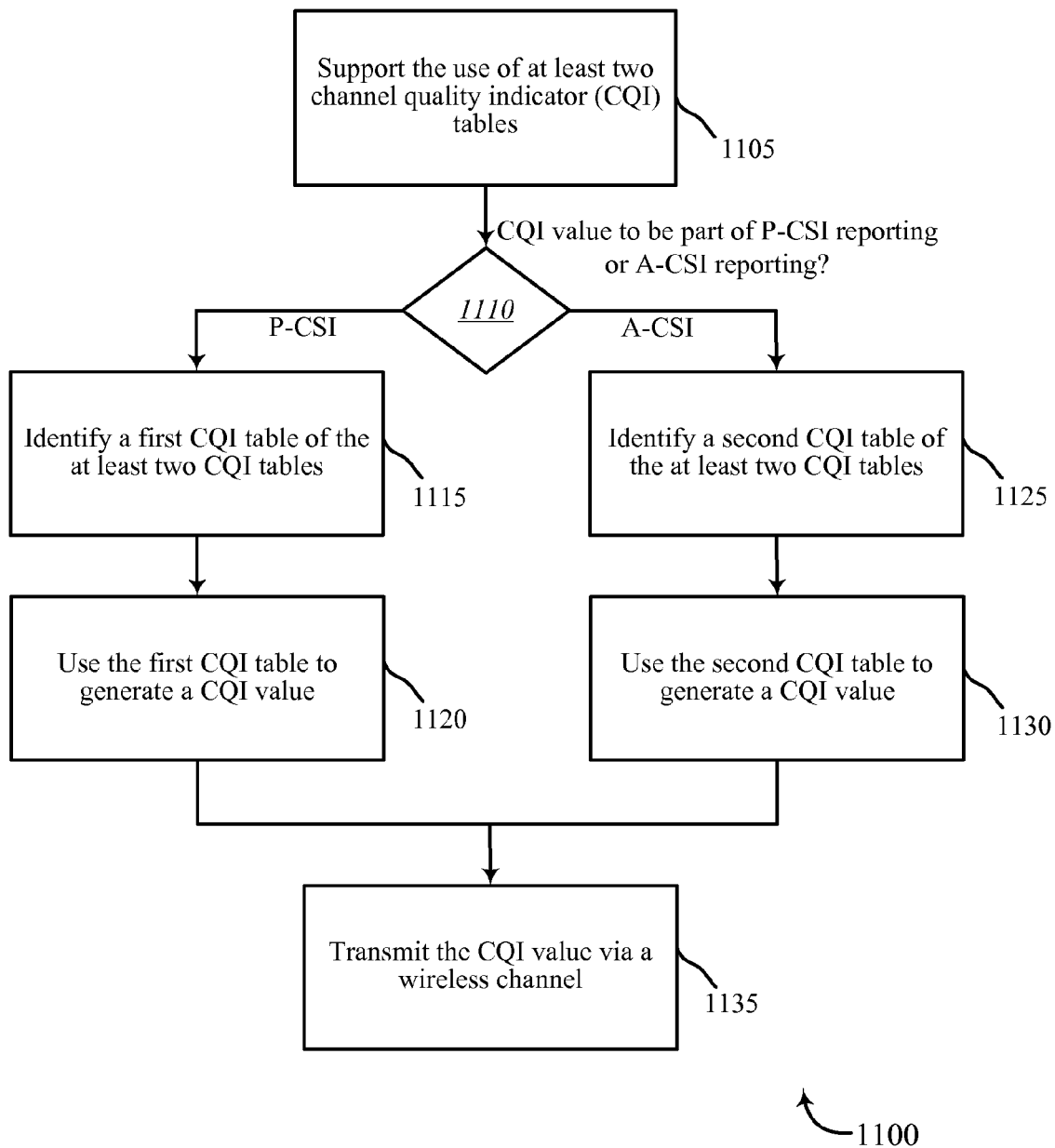
FIG. 11 is a flow chart of a method for selecting between different CQI tables based on a reporting schedule of the CQI value.

FIG. 11 is a flow chart illustrating one example of a method 1100 for wireless communications. For clarity, the method 1100 is described below with reference to the UE 115 of FIGS. 1, 2, 3, 4A, and/or 8. In some cases, the method 1100 is described below with reference to the example CQI tables of FIG. 4B. In one implementation, the UE table selection module 210 of FIGS. 2, 3, 4A, and/or 8 may execute one or more sets of codes to control the functional elements of the UE 115 to perform the functions described below.

At block 1105, the use of at least two CQI tables may be supported. At block 1110, a determination may be made as to whether a CQI value is to be part of P-CSI reporting or A-CSI reporting. If it is determined that the CQI value is to be part of P-CSI reporting, at block 1115, a first CQI table may be identified. At block 1120, the first CQI table may be used to generate a CQI value.

If, however, it is determined that the CQI value is to be part of A-CSI reporting, at block 1125, a second CQI table may be identified that is different from the first CQI table. At block 1130, the second CQI table may be used to generate a CQI value. In one example, the number of bits used to represent the generated CQI value is the same and is independent of the selected CQI table. At block 1135, the CQI value may be transmitted via a wireless channel.

Thus, the method 1100 may provide for a selection of different CQI tables based on a reporting schedule of the CQI value. It should be noted that the method 1100 is just one implementation and that the operations of the method 1100 may be rearranged or otherwise modified such that other implementations are possible.

Figure 12:
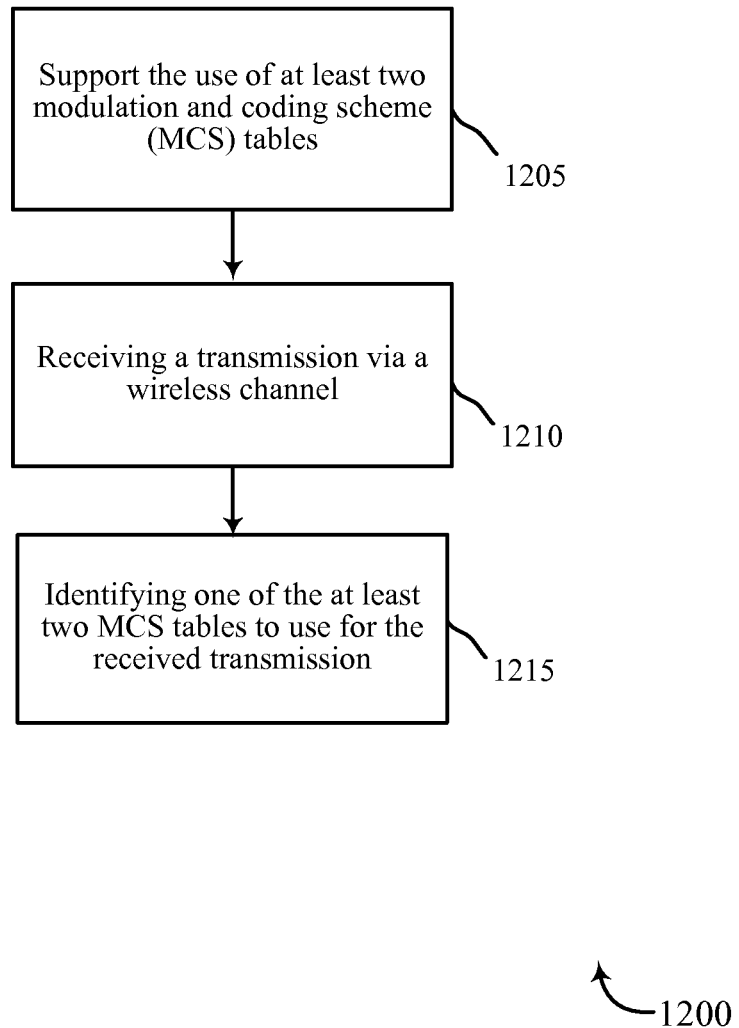
FIG. 12 is a flow chart of a method for selecting an MCS table to identify an MCS for a received transmission'

FIG. 12 is a flow chart illustrating one example of a method 1200 for wireless communications. For clarity, the method 1200 is described below with reference to the UE 115 of FIGS. 1, 2, 3, 4A, and/or 8. In some cases, the method 1200 is described below with reference to the example MCS tables of FIG. 4C. In one implementation, the UE table selection module 210 of FIGS. 2, 3, 4A, and/or 8 may execute one or more sets of codes to control the functional elements of the UE 115 to perform the functions described below.

At block 1205, the use of at least two MCS tables may be supported. At block 1210, a transmission may be received via a wireless channel. For example, the transmission may be received from an eNB 105 via a downlink channel. At block 1215, one of the MCS tables may be identified for the received transmission. The identified MCS table may be used to identify an MCS to apply to the received transmission. The identified MCS may indicate a demodulation and decoding scheme to apply to the received transmission. At least one of the MCS tables may support a higher order modulation scheme, such as, but not limited to 256QAM.

Thus, the method 1200 may provide for a selection of different MCS tables to identify an MCS for the received transmission. It should be noted that the method 1200 is just one implementation and that the operations of the method 1200 may be rearranged or otherwise modified such that other implementations are possible.

Figure 13:
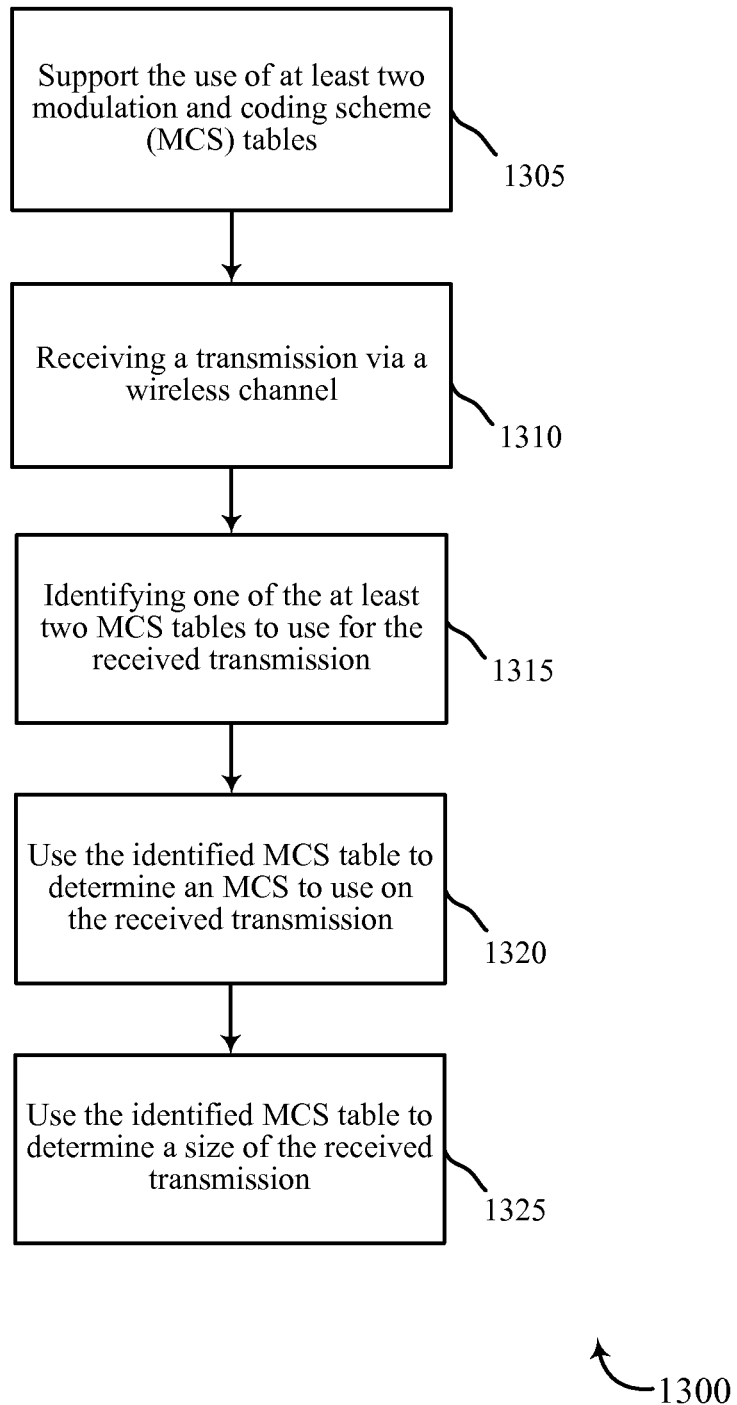
FIG. 13 is a flow chart of a method for selecting an MCS tables to identify an MCS for a received transmission as well as a size of the transmission.

FIG. 13 is a flow chart illustrating one example of a method 1300 for wireless communications. For clarity, the method 1300 is described below with reference to the UE 115 of FIGS. 1, 2, 3, 4A, and/or 8. In some cases, the method 1300 is described below with reference to the example MCS tables of FIG. 4C. In one implementation, the UE table selection module 210 of FIGS. 2, 3, 4A, and/or 8 may execute one or more sets of codes to control the functional elements of the UE 115 to perform the functions described below.

At block 1305, the use of at least two MCS tables may be supported. At block 1310, a transmission may be received via a wireless channel. At block 1315, one of the MCS tables may be identified to use for the received transmission. At block 1320, the identified MCS table may be used to determine an MCS to use on the received transmission. At block 1325, the identified MCS table may also be used to identify a size of the received transmission. As previously explained, each MCS index value included in an MCS table may be mapped to a TBS table that indicates the size of a transport block being transmitted.

Therefore, the method 1300 may provide for a selection of different MCS tables to identify an MCS for the received transmission as well as a size of the transmission. It should be noted that the method 1300 is just one implementation and that the operations of the method 1300 may be rearranged or otherwise modified such that other implementations are possible.

With regards to the UE 115, the present systems and methods may be implemented as a new capability on the UE 115. In another example, the present systems and methods may be implemented into current UE categories and/or by adding new UE categories. The present systems and methods may increase a maximum size that the UE is able to process in a subframe and/or a transport block currently defined in each UE category may be increased.

In one example, the present systems and methods may be applied to uplink transmissions if higher order MCS (e.g., 256QAM) are supported for the uplink. In one configuration, new MCS tables used to identify MCSs for uplink transmissions may be different from the new MCS tables used to determine MCSs for downlink transmissions.

Figure 14:
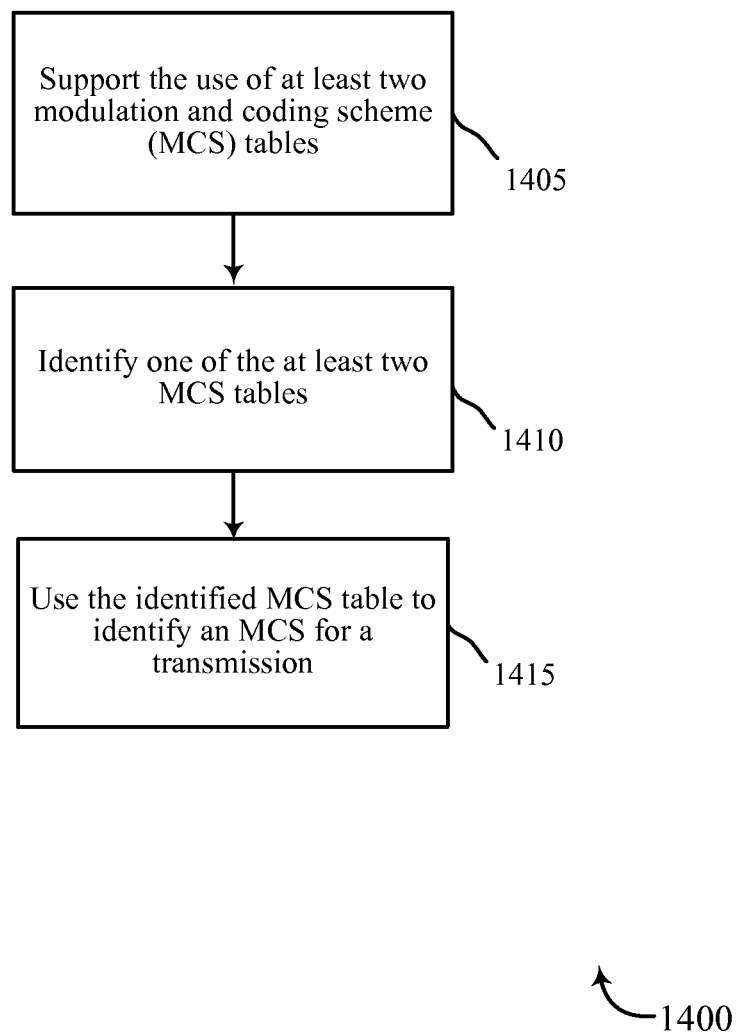
FIG. 14 is a flow chart of a method for selecting between different MCS tables to identify an MCS for a transmission.

FIG. 14 is a flow chart illustrating one example of a method 1400 for wireless communications. For clarity, the method 1400 is described below with reference to the eNB 105 of FIGS. 1, 5, 6, 7, and/or 8. In some cases, the method 1400 is described below with reference to the example MCS tables of FIG. 4C. In one implementation, the eNB table selection module 510 of FIGS. 5, 6, 7, and/or 8 may execute one or more sets of codes to control the functional elements of the eNB 105 to perform the functions described below.

At block 1405, the use of at least two MCS tables may be supported. At block 1410, one of the MCS tables may be identified. The identified MCS table may be used, at block 1415, to identify an MCS for a transmission. The identified MCS may be for a downlink transmission. In one configuration, the identified MCS may be for an uplink transmission. At least one of the MCS tables may support a higher order modulation scheme, such as, but not limited to 256QAM.

Thus, the method 1400 may provide for a selection of different MCS tables to identify an MCS for a transmission. It should be noted that the method 1400 is just one implementation and that the operations of the method 1400 may be rearranged or otherwise modified such that other implementations are possible.

Figure 15:
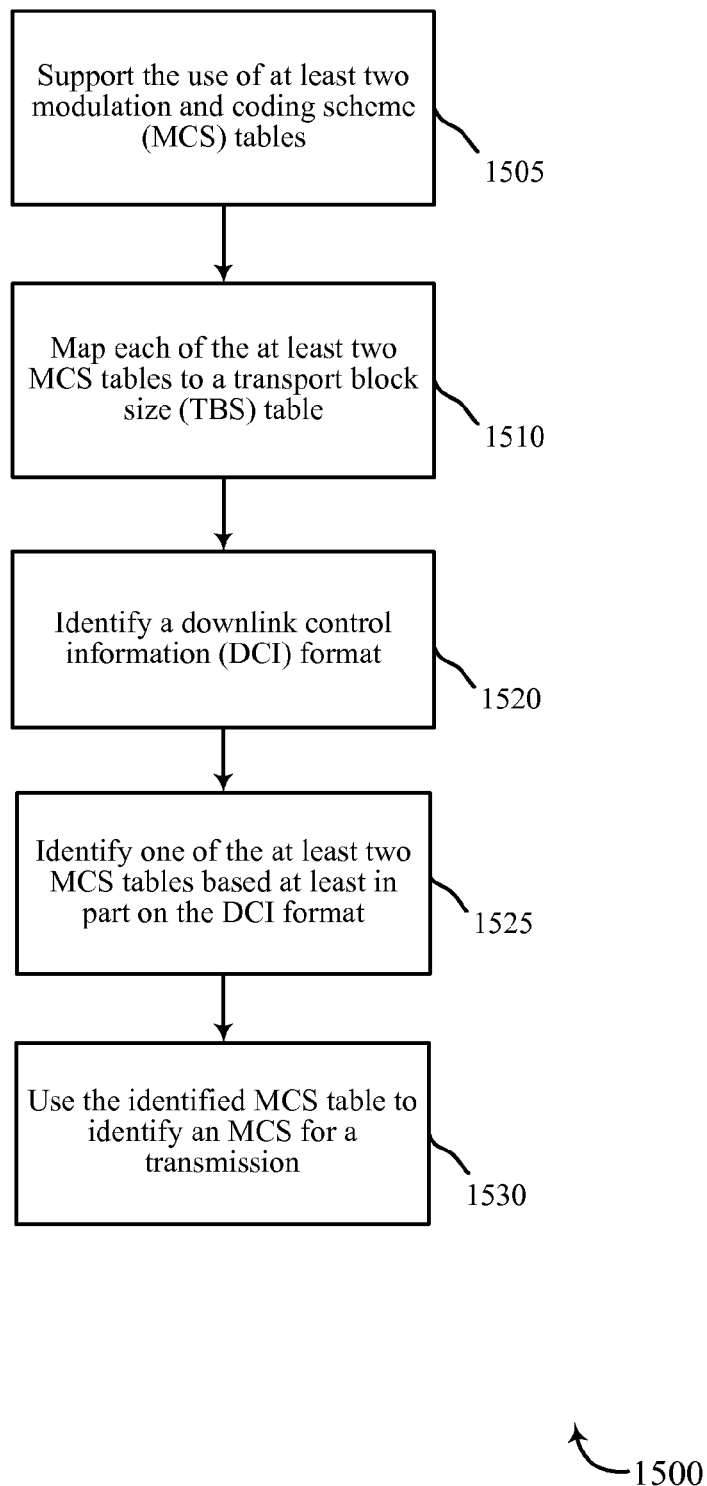
FIG. 15 is a flow chart of a method for mapping different MCS tables to transport block size (TBS) tables and selecting an MCS table based on a downlink control information (DCI) format.

FIG. 15 is a flow chart illustrating one example of a method 1500 for wireless communications. For clarity, the method 1500 is described below with reference to the eNB 105 of FIGS. 1, 5, 6, 7, and/or 8. In some cases, the method 1500 is described below with reference to the example MCS tables of FIG. 4C. In one implementation, the eNB table selection module 510 of FIGS. 5, 6, 7, and/or 8 may execute one or more sets of codes to control the functional elements of the eNB 105 to perform the functions described below.

At block 1505, the use of at least two MCS tables may be supported. At block 1510, each of the MCS tables may be mapped to a TBS table. At block 1520, a DCI format may be identified. At block 1525, one of the MCS tables may be identified based at least in part on the identified DCI format. At block 1530, the identified MCS table may be used to identify an MCS for a transmission.

Therefore, the method 1500 may provide for mapping different MCS tables to TBS tables and selecting an MCS table based on a DCI format. It should be noted that the method 1500 is just one implementation and that the operations of the method 1500 may be rearranged or otherwise modified such that other implementations are possible.

Figure 16:
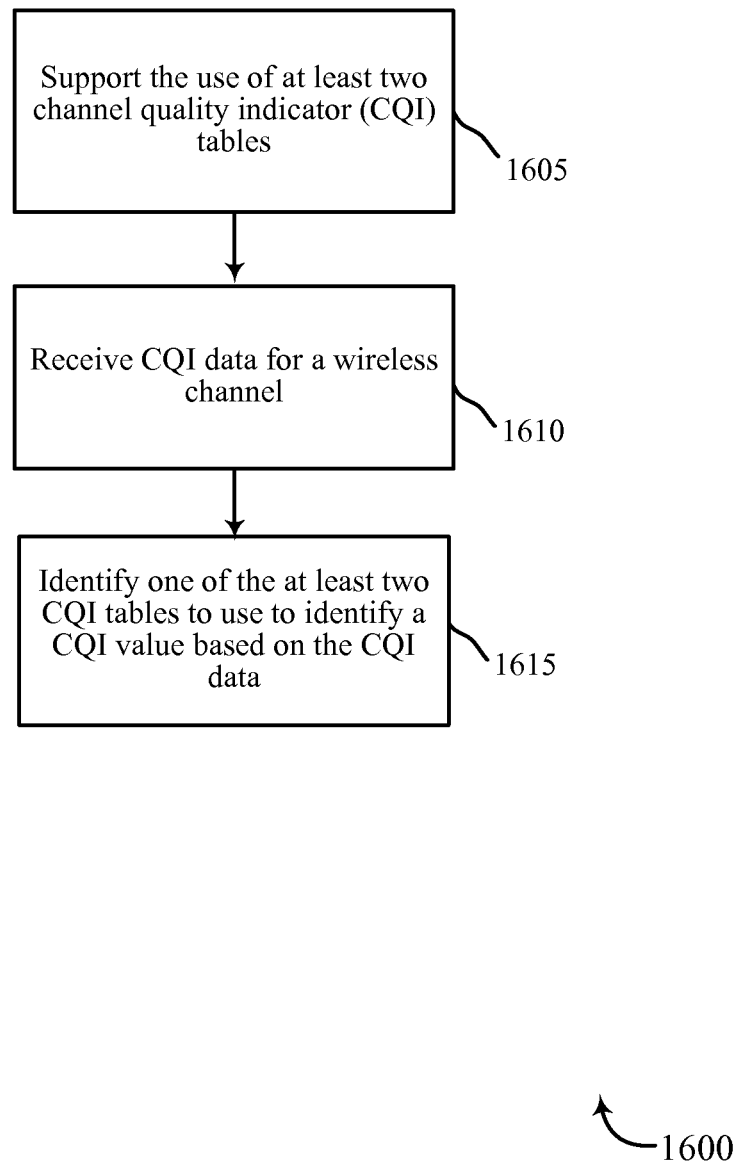
FIG. 16 is a flow chart of a method to select a CQI table to identify a CQI value that is based on received CQI data.

FIG. 16 is a flow chart illustrating one example of a method 1600 for wireless communications. For clarity, the method 1600 is described below with reference to the eNB 105 of FIGS. 1, 5, 6, 7, and/or 8. In some cases, the method 1600 is described below with reference to the example CQI tables of FIG. 4B. In one implementation, the eNB table selection module 510 of FIGS. 5, 6, 7, and/or 8 may execute one or more sets of codes to control the functional elements of the eNB 105 to perform the functions described below.

At block 1605, the use of at least two CQI tables may be supported. At block 1610, CQI data for a wireless channel may be received. At block 1615, one of the CQI tables may be identified. The identified table may be used to identify a CQI value based on the received CQI data.

Thus, the method 1600 may provide for a selection of a CQI table to identify a CQI value that is based on received CQI data. It should be noted that the method 1600 is just one implementation and that the operations of the method 1600 may be rearranged or otherwise modified such that other implementations are possible.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Techniques described above may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving a transmission via a wireless channel;
   identifying a format of control channel used to transmit the received transmission; and
   identifying one of at least two supported modulation and coding scheme (MCS) tables to use for the received transmission based at least in part on the identified format of control channel.

2. The method of claim 1, further comprising:
   using the identified MCS table to determine an MCS to use for the received transmission.

3. The method of claim 1, wherein a first transport block size (TBS) table is mapped from a first MCS table and a second TBS table is mapped from a second MCS table, the second TBS table comprising at least one TBS that is greater than a maximum TBS in the first TBS table.

4. The method of claim 3, further comprising:
   identifying a TBS table mapped from the identified MCS table;
   using the identified TBS table to determine a size of the received transmission.

5. The method of claim 1, further comprising:
   using the identified MCS table to determine an MCS to use for an uplink transmission.

6. The method of claim 1, wherein a first number of bits is used to represent a first MCS based on a first MCS table, and a second number of bits is used to represent a second MCS based on a second MCS table.

7. The method of claim 6, wherein the first number of bits is the same as the second number of bits.

8. The method of claim 1, wherein the identifying one of the at least two MCS tables comprises:
   dynamically selecting the MCS table to use for the received transmission.

9. The method of claim 1, wherein identifying one of the at least two MCS tables comprises:
   selecting the MCS table to use for the received transmission according to a predefined configuration setting.

10. An apparatus for wireless communications, comprising:
    a processor;
    a memory in electronic communication with the processor; and
    instructions stored in the memory, the instructions being executable by the processor to:
       receive a transmission via a wireless channel;
       identify a format of control channel used to transmit the received transmission; and
       identify one of at least two supported modulation and coding scheme (MCS) tables to use for the received transmission based at least in part on the identified format of control channel.

11. The apparatus of claim 10, wherein the instructions are executable by the processor to:
    use the identified MCS table to determine an MCS to use for the received transmission.

12. The apparatus of claim 10, wherein a first transport block size (TBS) table is mapped from a first MCS table and a second TBS table is mapped from a second MCS table, the second TBS table comprising at least one TBS that is greater than a maximum TBS in the first TBS table.

13. The apparatus of claim 12, wherein the instructions are executable by the processor to:
    identify a TBS table mapped from the identified MCS table;
    use the identified TBS table to determine a size of the received transmission.

14. The apparatus of claim 10, wherein the instructions are executable by the processor to:
    use the identified MCS table to determine an MCS to use for an uplink transmission.

15. The apparatus of claim 10, wherein a first number of bits is used to represent a first MCS based on a first MCS table, and a second number of bits is used to represent a second MCS based on a second MCS table.

16. The apparatus of claim 15, wherein the first number of bits is the same as the second number of bits.

17. The apparatus of claim 10, wherein the instructions to identify one of the at least two MCS tables are executable by the processor to:
    dynamically select the MCS table to use for the received transmission.

18. The apparatus of claim 10, wherein the instructions to identify one of the at least two MCS tables are executable by the processor to:
    select the MCS table to use for the received transmission according to a predefined configuration setting.

19. An apparatus for wireless communications, comprising:
    means for receiving a transmission via a wireless channel;
    means for identifying a format of control channel used to transmit the received transmission; and
    means for identifying one of at least two supported modulation and coding scheme (MCS) tables to use for the received transmission based at least in part on the identified format of control channel.

20. The apparatus of claim 19, further comprising:
    means for using the identified MCS table to determine an MCS to use for the received transmission.

21. The apparatus of claim 19, wherein a first number of bits is used to represent a first MCS based on a first MCS table, and a second number of bits is used to represent a second MCS based on a second MCS table.

22. The apparatus of claim 21, wherein the first number of bits is the same as the second number of bits.

23. A non-transitory computer-readable medium storing instructions executable by a processor to:
    receive a transmission via a wireless channel;
    identify a format of control channel used to transmit the received transmission; and
    identify one of at least two supported modulation and coding scheme (MCS) tables to use for the received transmission based at least in part on the identified format of control channel.

24. A method for wireless communications, comprising:
    identifying one of at least two supported modulation and coding scheme (MCS) tables, wherein the identification of one of the at least two MCS tables is based at least in part on a downlink control information (DCI) format; and using the identified MCS table to identify an MCS for a transmission.

25. The method of claim 24, wherein the using the identified MCS table to identify the MCS comprises:
selecting the MCS for a downlink transmission.

26. The method of claim 24, wherein the using the identified MCS table to identify the MCS comprises:
selecting the MCS for an uplink transmission.

27. The method of claim 24, wherein a first number of bits is used to represent a first MCS based on a first MCS table, and a second number of bits is used to represent a second MCS based on a second MCS table.

28. The method of claim 27, wherein the first number of bits is the same as the second number of bits.

29. The method of claim 24, further comprising:
associating a single MCS table with each assignment of a physical downlink shared channel (PDSCH).

30. The method of claim 24, further comprising:
identifying at least two codewords to be transmitted via a single physical downlink shared channel (PDSCH); and
using the identified one of the at least two MCS tables for downlink transmissions of the at least two codewords.

31. The method of claim 24, further comprising:
identifying a format of control channel to be used for the transmission; and
identifying one of the at least two MCS tables to use for the transmission based at least in part on the identified format of control channel.

32. The method of claim 24, further comprising:
identifying a set of candidates for a control channel transmission; and
identifying one of the at least two MCS tables to use for the control channel transmission based at least in part on the identified set of candidates.

33. The method of claim 32, wherein a first set of candidates are associated with a common search space, and a second set of candidates are associated with a user equipment specific search space.

34. The method of claim 33, further comprising:
identifying at least one candidate associated with both the common search space and the user equipment search space; and
identifying one of the at least two MCS tables based at least in part on a predefined rule.

35. The method of claim 24, further comprising:
identifying a type of the transmission to occur on a wireless channel; and
identifying one of the at least two MCS tables to use for the transmission based at least in part on the identified type of transmission.

36. The method of claim 24, wherein the identifying one of the at least two MCS tables comprises:
dynamically selecting the MCS table to use for the transmission.

37. The method of claim 36, wherein the dynamic selection of the MCS table is performed by an information field in downlink control information, where the information field selects one of a plurality of sets of configurations, where each set of configuration comprises parameters including an MCS table indicator and at least one of a rate matching parameter and a quasi-co-location indication parameter.

38. The method of claim 24, wherein identifying one of the at least two MCS tables comprises:
selecting the MCS table to use for the transmission according to a predefined configuration setting.

39. The method of claim 24, wherein an MCS table comprises a listing of MCSs, each MCS being mapped to at least one of a modulation scheme and a transport block size (TBS).

40. The method of claim 39, wherein a first TBS table is mapped from a first MCS table and a second TBS table is mapped from a second MCS table, the second TBS table comprising at least one TBS that is greater than a maximum TBS in the first TBS table.

41. The method of claim 24, wherein at least one of the identified MCS tables supports 256 Quadrature Amplitude Modulation (QAM).

42. An apparatus for wireless communications, comprising:
a processor;
a memory in electronic communication with the processor; and
instructions stored in the memory, the instructions being executable by the processor to:
identify one of at least two supported modulation and coding scheme (MCS) tables, wherein the identification of one of the at least two MCS tables is based at least in part on a downlink control information (DCI) format; and
use the identified MCS table to identify an MCS for a transmission.

43. The apparatus of claim 42, wherein the instructions to use the identified MCS table to identify the MCS are executable by the processor to:
select the MCS for a downlink transmission.

44. The apparatus of claim 42, wherein the instructions to use the identified MCS table to identify the MCS are executable by the processor to:
select the MCS for an uplink transmission.

45. The apparatus of claim 42, wherein a first number of bits is used to represent a first MCS based on a first MCS table, and a second number of bits is used to represent a second MCS based on a second MCS table.

46. The apparatus of claim 42, wherein the first number of bits is the same as the second number of bits.

47. The apparatus of claim 42, wherein the instructions are executable by the processor to:
associate a single MCS table with each assignment of a physical downlink shared channel (PDSCH).

48. The apparatus of claim 42, wherein the instructions are executable by the processor to:
identify at least two codewords to be transmitted via a single physical downlink shared channel (PDSCH); and
use the identified one of the at least two MCS tables for downlink transmissions of the at least two codewords.

49. The apparatus of claim 42, wherein the instructions are executable by the processor to:
identify a format of control channel to be used for the transmission; and
identify one of the at least two MCS tables to use for the transmission based at least in part on the identified format of control channel.

50. The apparatus of claim 42, wherein the instructions are executable by the processor to:
identify a set of candidates for a control channel transmission; and
identify one of the at least two MCS tables to use for the control channel transmission based at least in part on the identified set of candidates.

51. The apparatus of claim 50, wherein a first set of candidates are associated with a common search space, and a second set of candidates are associated with a user equipment specific search space.

52. The apparatus of claim 51, wherein the instructions are executable by the processor to:
  identify at least one candidate associated with both the common search space and the user equipment search space; and
  identify one of the at least two MCS tables based at least in part on a predefined rule.

53. The apparatus of claim 42, wherein the instructions are executable by the processor to:
  identify a type of the transmission to occur on a wireless channel; and
  identify one of the at least two MCS tables to use for the transmission based at least in part on the identified type of transmission.

54. The apparatus of claim 42, wherein the instructions to identify one of the at least two MCS tables are executable by the processor to:
  dynamically select the MCS table to use for the transmission.

55. The apparatus of claim 54, wherein the dynamic selection of the MCS table is performed by an information field in downlink control information, where the information field selects one of a plurality of sets of configurations, where each set of configuration comprises parameters including an MCS table indicator and at least one of a rate matching parameter and a quasi-co-location indication parameter.

56. The apparatus of claim 42, wherein the instructions to identify one of the at least two MCS tables are executable by the processor to:
  select the MCS table to use for the transmission according to a predefined configuration setting.

57. The apparatus of claim 42, wherein an MCS table comprises a listing of MCSs, each MCS being mapped to at least one of a modulation scheme and a transport block size (TBS).

58. The apparatus of claim 57, wherein a first TBS table is mapped from a first MCS table and a second TBS table is mapped from a second MCS table, the second TBS table comprising at least one TBS that is greater than a maximum TBS in the first TBS table.

59. The apparatus of claim 42, wherein at least one of the identified MCS tables supports 256 Quadrature Amplitude Modulation (QAM).

60. An apparatus for wireless communications, comprising:
  means for identifying one of at least two supported modulation and coding scheme (MCS) tables, wherein the identification of one of the at least two MCS tables is based at least in part on a downlink control information (DCI) format; and
  means for using the identified MCS table to identify an MCS for a transmission.

61. The apparatus of claim 60, further comprising:
  means for selecting the MCS for downlink transmission.

62. The apparatus of claim 60, further comprising:
  means for selecting the MCS for an uplink transmission.

63. A non-transitory computer-readable medium storing instructions executable by a processor to:
  identify one of at least two supported modulation and coding scheme (MCS) tables, wherein the identification of one of the at least two MCS tables is based at least in part on a downlink control information (DCI) format; and
  use the identified MCS table to identify an MCS for a transmission.

64. The non-transitory computer-readable medium of claim 63, wherein the instructions to use the identified MCS table to identify the MCS are executable by the processor to:
  select the MCS for a downlink transmission.

65. The method of claim 1, wherein the identifying a format of control channel used to transmit the received transmission comprises:
  identifying a downlink control information (DCI) format used to transmit the received transmission.

66. The apparatus of claim 10, wherein the instructions to identify a format of control channel used to transmit the received transmission are executable by the processor to:
  identify a downlink control information (DCI) format used to transmit the received transmission.

67. The apparatus of claim 19, wherein the means for identifying a format of control channel used to transmit the received transmission comprises:
  means for identifying a downlink control information (DCI) format used to transmit the received transmission.

68. The non-transitory computer-readable medium of claim 23, wherein the instructions to identify a format of control channel used to transmit the received transmission are executable by the processor to:
  identify a downlink control information (DCI) format used to transmit the received transmission.

69. A method for wireless communications, comprising:
  receiving a transmission via a wireless channel;
  determining a type of transmission used to transmit the received transmission; and
  identifying one of at least two supported modulation and coding scheme (MCS) tables to use for the received transmission based at least in part on the determined type of transmission.

70. The method of claim 69, wherein the determining a type of transmission used to transmit the received transmission comprises:
  determining a broadcast transmission used to transmit the received transmission.

71. The method of claim 69, wherein the determining a type of transmission used to transmit the received transmission comprises:
  determining a random access response used to transmit the received transmission.

72. The method of claim 69, wherein the determining a type of transmission used to transmit the received transmission comprises:
  determining a unicast transmission used to transmit the received transmission.

73. The method of claim 69, wherein the determining a type of transmission used to transmit the received transmission comprises:
  determining a multi-cast transmission used to transmit the received transmission.

74. The method of claim 69, wherein the determining a type of transmission used to transmit the received transmission comprises:
  determining the type of transmission used to transmit the received transmission as a type of scheduling used to transmit the received transmission; and
  determining a semi-persistent scheduling (SPS) of a service used to transmit the received transmission.

75. An apparatus for wireless communications, comprising:
  a processor;
  a memory in electronic communication with the processor; and instructions stored in the memory, the instructions being executable by the processor to:
receive a transmission via a wireless channel a transmission via a wireless channel;
determine a type of transmission used to transmit the received transmission; and
identify one of at least two supported modulation and coding scheme (MCS) tables to use for the received transmission based at least in part on the determined type of transmission.

76. The apparatus of claim 75, wherein the instructions to determine a type of transmission used to transmit the received transmission are executable by the processor to:
determine a broadcast transmission used to transmit the received transmission.

77. The apparatus of claim 75, wherein the instructions to determine a type of transmission used to transmit the received transmission are executable by the processor to:
determine a random access response used to transmit the received transmission.

78. The apparatus of claim 75, wherein the instructions to determine a type of transmission used to transmit the received transmission are executable by the processor to:
determine a unicast transmission used to transmit the received transmission.

79. The apparatus of claim 75, wherein the instructions to determine a type of transmission used to transmit the received transmission are executable by the processor to:
determine a multi-cast transmission used to transmit the received transmission.

80. The apparatus of claim 75, wherein the instructions to determine a type of transmission used to transmit the received transmission are executable by the processor to:
determine the type of transmission used to transmit the received transmission as a type of scheduling used to transmit the received transmission; and
determine a semi-persistent scheduling (SPS) of a service used to transmit the received transmission.

81. A method for wireless communications, comprising:
identifying one of at least two supported modulation and coding scheme (MCS) tables;
identifying a channel quality indicator (CQI) value; and
using the identified MCS table and the identified CQI value to identify an MCS for a transmission.

82. The method of claim 81, wherein the using the identified MCS table to identify the MCS comprises:
selecting the MCS for a downlink transmission.

83. An apparatus for wireless communications, comprising:
a processor;
a memory in electronic communication with the processor; and
instructions stored in the memory, the instructions being executable by the processor to:
identify one of at least two supported modulation and coding scheme (MCS) tables;
identify a channel quality indicator (CQI) value; and
use the identified MCS table and the identified CQI value to identify an MCS for a transmission.

84. The apparatus of claim 83, wherein the instructions to use the identified MCS table to identify the MCS are executable by the processor to:
select the MCS for a downlink transmission.

85. An apparatus for wireless communications, comprising:
means for identifying one of at least two supported modulation and coding scheme (MCS) tables;
means for identifying a channel quality indicator (CQI) value; and
means for using the identified MCS table and the identified CQI value to identify an MCS for a transmission.

86. The apparatus of claim 85, further comprising:
means for selecting the MCS for downlink transmission.

* * * * *